(12) United States Patent
Date et al.

(10) Patent No.: US 6,454,676 B1
(45) Date of Patent: Sep. 24, 2002

(54) CONTROL SYSTEM FOR INTERNAL COMBUSTION ENGINE EQUIPPED WITH AUTOMATIC TRANSMISSION

(75) Inventors: Toshiaki Date; Shiro Yonezawa; Hirofumi Ohuchi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 57 days.

(21) Appl. No.: 09/705,795

(22) Filed: Nov. 6, 2000

(30) Foreign Application Priority Data

May 12, 2000 (JP) ........................ 2000-139958

(51) Int. Cl.[7] .......................... B60K 41/02; F16H 59/48
(52) U.S. Cl. .......................... 477/77; 477/120
(58) Field of Search .................. 477/77, 78, 90, 477/115, 120, 121, 181

(56) References Cited

U.S. PATENT DOCUMENTS

| 5,368,530 A | * | 11/1994 | Sanematsu et al. | ........... 477/43 |
| 5,403,245 A | * | 4/1995 | Watanabe et al. | ............. 477/54 |
| 5,476,425 A | * | 12/1995 | Shiraishi et al. | ........ 477/121 X |
| 5,564,796 A | * | 10/1996 | Saito et al. | ................. 303/112 |
| 5,598,336 A | * | 1/1997 | Kume et al. | ............ 477/120 X |
| 5,637,052 A | * | 6/1997 | Hirota et al. | ............. 477/77 X |
| 5,771,171 A | * | 6/1998 | Tazawa | ................... 477/121 X |
| 5,776,030 A | * | 7/1998 | Minowa et al. | ......... 477/120 X |
| 5,931,884 A | * | 8/1999 | Ochiai | .................... 477/115 X |
| 6,076,032 A | * | 6/2000 | Kuroda et al. | ............ 477/97 X |
| 6,188,943 B1 | * | 2/2001 | Ushida et al. | .......... 477/115 X |
| 6,259,986 B1 | * | 7/2001 | Kotwicki | ................ 477/113 X |
| 6,332,859 B1 | * | 12/2001 | Sato et al. | .............. 477/115 X |

FOREIGN PATENT DOCUMENTS

| JP | 7-332446 | 12/1995 |
| JP | 10-324176 | 12/1998 |
| JP | 11-1135 | 1/1999 |

* cited by examiner

Primary Examiner—Charles A. Marmor
Assistant Examiner—Roger Pang
(74) Attorney, Agent, or Firm—Sughrue Mion, PLLC

(57) ABSTRACT

A control system for an internal combustion engine equipped with an automatic transmission capable of performing controls of the engine at a minimum fuel-performance cost or fuel consumption even in a nonlock-up state by correcting a target driving power so as to conform with a transmission efficiency of the automatic transmission.

14 Claims, 19 Drawing Sheets

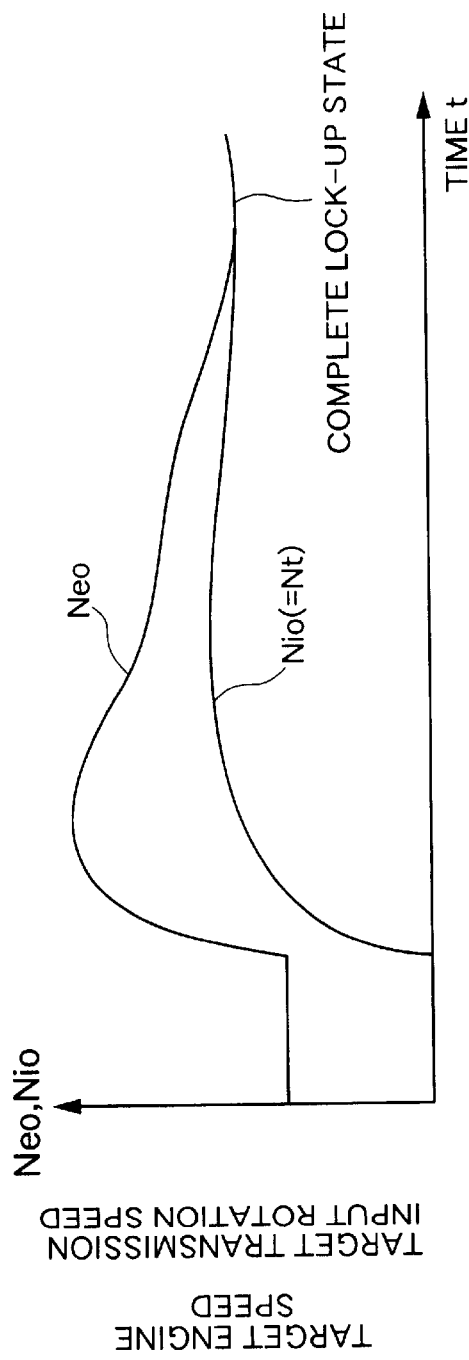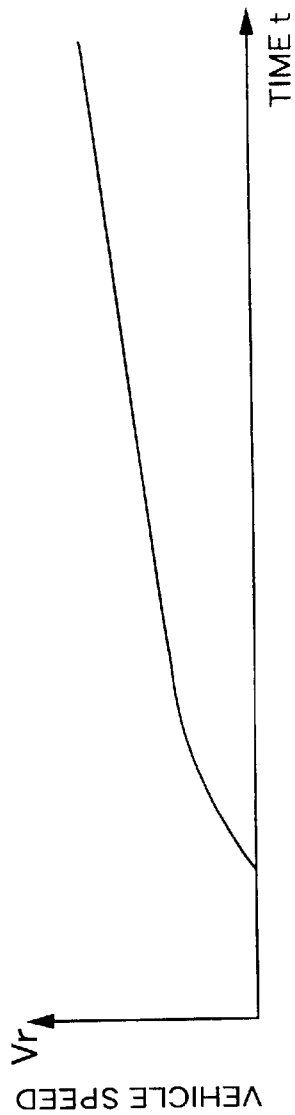

CONTROL SYSTEM FOR INTERNAL COMBUSTION ENGINE EQUIPPED WITH AUTOMATIC TRANSMISSION

BACKGROUND OF THE INVENTION

1. Field of the Invention

The present invention relates generally to a control system for an internal combustion engine equipped with an automatic transmission for driving a motor vehicle such as an automobile, car and so forth. More particularly, the present invention is concerned with an automatic-transmission-equipped engine control system which is capable of controlling a driving power at a minimum fuel consumption even in the nonlock-up state of input/output elements of an input clutch (i.e., even when the input clutch which may be constituted by a torque converter including a fluid coupler portion are not in the state where the input element and the output element thereof are directly or straight-forwardly coupled with each other.

2. Description of Related Art

In general, the automatic transmission operatively coupled to an internal combustion engine (hereinafter also referred to simply as the engine) includes an input clutch and a continuously variable transmission (also termed CVT in short) for regulating variably the transmission gear ratio in a stepless manner or continuously.

In the automatic-transmission-equipped engine control system of this type, it is required to optimize the engine operation range with a view to enhancing the fuel-cost performance by resorting to cooperative control of the engine and the continuously variable transmission (CVT) regardless of whether the input clutch is in the nonlock-up state or in a changeover or switching phase intervening between the nonlock-up state and the lock-up state.

As the conventional automatic-transmission-equipped engine control systems known heretofore, there may be mentioned driving power control systems for the motor vehicles such as those described below.

In the first place, reference may be made to Japanese Patent Publication No. 62263/1993. In this publication, there is disclosed such an arrangement of the conventional automatic-transmission-equipped engine control system in which the desired or target driving power demanded by the driver is corrected or modified in dependence on the operating state of the engine, whereon target values of the control parameters for the engine and the automatic transmission are arithmetically determined.

At this juncture, it should be mentioned that the desired or target level or value of the driving power is basically determined on the basis of the accelerator pedal actuation quantity (hereinafter also referred to as the accelerator pedal stroke) and the speed of the motor vehicle on which the engine is mounted. This speed will hereinafter be referred to as the motor vehicle speed or simply as the vehicle speed or car speed. The target value of the driving power thus determined is then corrected in view of the engine operating state such as the rate of change of the accelerator pedal stroke, the slope of a road on which the motor vehicle is running and the running state of the motor vehicle such as the weight of the motor vehicle and the like.

As the target control parameters for the target driving power, there are arithmetically determined the target engine torque and the target transmission gear ratio (target value of the ratio in the rotation speed (rpm) between the input and output shafts of the continuously variable transmission or CVT).

In succession, the engine torque is modified or corrected so that the actual driving power and the target or demanded driving power coincides with each other, while the engine output control unit is so controlled that the transmission gear ratio of the continuously variable transmission (CVT) coincides with the target transmission gear ratio (i.e., target value of the transmission gear ratio).

In this manner, not only the fuel-cost performance of the motor vehicle is improved but also the engine output power control can be realized with enhanced response performance in the transition state of the motor vehicle. Thus, the excellent maneuverability of the motor vehicle can be realized while realizing the target driving power, i.e., driving power demanded by the driver.

Further, Japanese Patent Application Laid-Open Publication No. 332446/1995 (JP-A-7-332446) discloses a speed change control unit for the continuously variable transmission (CVT) in which a speed-change map data prepared with importance being put on to the fuel-cost performance and a speed-change map data prepared with importance being put on the engine power are employed, wherein the transmission gear ratio is determined by interpolating each of the speed-change map data in accordance with a signal bearing correlation to the rate of change of the engine load.

In this way, the speed change control which ensures the most appropriate engine output performance can be carried out in conformance with the acceleration demanded by the driver.

Furthermore, in the continuously variable transmission (CVT) described in Japanese Patent Application Laid-Open Publications Nos. 1135/1999 and 324176/1998, a torque converter or the like is employed as the input clutch, wherein in the state where the input and output shafts of the torque converter are not directly intercoupled (i.e., in the nonlock-up state or in the converter state, so to say), the target transmission gear ratio and the target engine torque are determined.

By way of example, according to the teaching disclosed in Japanese Patent Application Laid-Open Publication No. 1135/1999, the target engine torque is corrected in dependence on the operating state of the mechanism for interrupting intermittently the CVT interrupting mechanism such as the start clutch, torque converter or the like.

Furthermore, according to the teaching disclosed in Japanese Patent Application Laid-Open Publication No. 1135/1999, control of the input shaft power (target driving power) of the automatic transmission (T/M) is realized in the state where the fuel consumption ratio is most preferable at the time point when the stable operation point at which the engine output torque coincides with the absorption torque of the automatic transmission has been reached.

However, with the conventional automatic-transmission-equipped engine control systems (i.e., driving power control systems) in which the input clutch typified by the fluid coupler such as the torque converter, for example, is employed as the intermittently interrupting mechanism of transmission, there arise inconveniences such described below when such a combination of the engine speed (rpm) and the engine torque is selected which can minimize the fuel consumption ratio in the nonlock-up state of the input/output elements of the input clutch.

More specifically, when such target engine speed and target engine torque which can minimize the fuel consumption in the nonlock-up state mentioned above are selected for controlling correspondingly the continuously variable transmission (CVT) and the intake air quantity regulating unit (throttle actuator), the speed ratio between the input and output shafts of the torque converter will become greater than "1" (one) or the engine speed (rpm) becomes greater than the input speed of the continuously variable transmission (CVT), to say in another way. Consequently, even when the continuously variable transmission (CVT) is controlled optimally, control to realize the demanded or target engine speed is impossible, incurring a problem that the target driving power as demanded by the driver can not be met.

For coping with the problem mentioned above, the engine control system described, for example, in Japanese Patent Application Laid-Open Publication No. 1135/1999 is so arranged as to modify or correct the output shaft torque of the continuously variable transmission (CVT) by dividing it by a torque ratio which is based on the speed ratio between the input shaft and the output shaft of the torque converter.

Owing to the arrangement described above, the driving power control accuracy can certainly be enhanced even in the nonlock-up state of the torque converter. Besides, in the engine control system disclosed in the above-mentioned publication, the arithmetic determination of the target transmission gear ratio and that of the target driving power are executed independently from each other. Consequently, improvement of the maneuvering performance of the motor vehicle can be made compatible to the improvement of the fuel-cost performance to a certain extent.

However, because the output shaft torque of the continuously variable transmission (CVT) is corrected by dividing it by the torque ratio of the torque converter, the driver's driving power demand can not always be met at the minimum fuel consumption through the control based on the combination of the corrected target transmission gear ratio (engine speed (rpm)) and the target engine torque.

On the other hand, in the engine control system disclosed in Japanese Patent Application Laid-Open Publication No. 324176/1998, the target driving power is controlled in the minimum fuel consumption state when the stable operation point has been attained. However, the conditions for allowing the stable operation point to be reached are limited. In this conjunction, it is noted that the control state of minimum fuel consumption can not be realized at any other point than the stable operation point.

As is obvious from the foregoing, the conventional automatic-transmission-equipped engine control systems known heretofore suffer a problem that the driving power control for realizing the minimum fuel consumption can not be realized in the case where the input and output elements of the input clutch such as the torque converter or the like are not in the lock-up state.

SUMMARY OF THE INVENTION

In the light of the state of the art described above, it is an object of the present invention to provide a control system for an internal combustion engine equipped with an automatic transmission, which control system can realize the fuel-cost performance improvement with the operation range being optimized by correcting the target driving power (i.e., target value of the driving power) in conformance with the transmission efficiency when the transmission efficiency of the input clutch is low (i.e., when it is smaller than 100%), while making the control possible at the operation point of the minimum fuel consumption (maximum fuel-cost efficiency) even in the nonlock-up state.

Another object of the present invention is to provide a control system for an internal combustion engine equipped with an automatic transmission, which control system is capable of performing the control at the minimum fuel consumption even in the nonlock-up state by arithmetically determining a target transmission input speed in dependence on the speed ratio between the input and output elements of the input clutch.

In view of the above and other objects which will become apparent as the description proceeds, there is provided according to a general aspect of the present invention a control system for an internal combustion engine equipped with an automatic transmission, which system includes a set of various types of sensors for detecting operating state of the internal combustion engine, an intake air quantity regulating unit for regulating adjustably an intake air quantity of the internal combustion engine, an automatic transmission including an input clutch and a continuously variable transmission (CVT) coupled operatively to the engine for regulating a transmission gear ratio continuously variably, and a control unit for controlling the engine and the automatic transmission on the basis of the operating state of the engine, wherein the control unit is comprised of a target driving power arithmetic module for arithmetically determining a target driving power of the engine on the basis of the operating state of the engine, a transmission efficiency arithmetic module for arithmetically determining a transmission efficiency of the input clutch, a target driving power correcting module for correcting the target driving power in dependence on the transmission efficiency to thereby determine arithmetically a corrected target driving power, a target value selecting module for selecting a combination of a target engine speed and a target engine torque for realizing the corrected target driving power, a target intake air quantity arithmetic module for arithmetically determining a target intake air quantity for realizing the target engine torque, and a target transmission input speed arithmetic module for arithmetically determining a target transmission input speed of the continuously variable transmission so that the input speed of the automatic transmission coincides with the target engine speed, wherein the intake air quantity regulating unit is so controlled that the intake air quantity of the engine coincides with the target intake air quantity, and wherein the transmission gear ratio is so controlled that the input speed of the continuously variable transmission coincides with the target transmission input speed.

By virtue of the arrangement of the control system for the internal combustion engine equipped with the automatic transmission described above, the fuel-cost performance improving control with the optimalized operation range can be realized. Besides, even in the nonlock-up state, the aimed or demanded control can be carried out at the operation point corresponding to the minimum fuel consumption (or at point corresponding to the maximum fuel consumption efficiency, to say in another way).

In a preferred mode for carrying out the invention, the target driving power correcting module may be constituted by a division module designed for dividing the target driving power by the transmission efficiency.

With the arrangement mentioned above, the control can be performed at the operation point corresponding to the minimum fuel consumption even in the nonlock-up state of the transmission.

In another preferred mode for carrying out the invention, the transmission efficiency arithmetic module may be so designed as to correct the transmission efficiency in dependence on the engine operating state.

Owing to the arrangement described above, the control can be performed at the operation point which can ensure the minimum fuel consumption independent of the engine operating state because the transmission efficiency is corrected in dependence on the engine operating state.

In yet another preferred mode for carrying out the invention, the transmission efficiency arithmetic module may include a lower limit value setting means for setting a lower limit value of the transmission efficiency.

With the arrangement described above, the target driving power can positively be protected against abnormal correction due to the transmission efficiency smaller than the lower limit value.

In still another preferred mode for carrying out the invention, the transmission efficiency arithmetic module may be so designed as to set the transmission efficiency to a given constant value when the transmission efficiency is not greater than a predetermined value.

By virtue of the arrangement described above, the control system which does not impair the driver's feeling of comfortableness can be realized.

In a further preferred mode for carrying out the invention, the transmission efficiency arithmetic module may be so designed as to set the transmission efficiency to a given constant value when operating state of the engine indicates that the vehicle speed is decelerating.

Owing to the arrangement described above, the control system which does not impair the driver's feeling of comfortableness can be realized.

In yet further preferred mode for carrying out the invention, the transmission efficiency arithmetic module may be so designed as to set the transmission efficiency to a given constant value when a speed ratio between an input element and an output element of the input clutch is decreasing.

With the arrangement described above, the engine control system which does not impair the driver's feeling of comfortableness can be realized.

In still further preferred mode for carrying out the invention, the input clutch may be comprised of a fluid type torque converter which includes a lock-up mechanism. The control unit may include a lock-up state detecting module for detecting a complete lock-up state of the lock-up mechanism. Correction of the target driving power can then be inhibited so long as the complete lock-up state is detected by the lock-up state detecting module.

With the arrangement of the automatic-transmission-equipped engine control system described above, the control system which does not impair the driver's feeling of comfortableness due to unnecessary correction of the target driving power can be realized.

In a preferred mode for carrying out the invention, the transmission efficiency arithmetic module may be so designed as to set the transmission efficiency fixedly to 100% when the lock-up mechanism is in the complete lock-up state, to t hereby inhibit the correction of the target driving power.

With the arrangement described above, the control system which does not impair the driver's feeling of comfortableness due to unnecessary correction of the target driving power can be realized.

In another preferred mode for carrying out the invention, the lock-up state detecting unit may be so designed as to detect the complete lock-up state of the lock-up mechanism, when difference in speed between an input shaft and an output shaft of the torque converter is less than a predetermined speed inclusive.

With the structure mentioned above, the complete lock-up state can be detected without fail.

In yet another preferred mode for carrying out the invention, the input clutch may be comprised of a fluid type torque converter, and the transmission efficiency arithmetic module may be so designed as to correct the transmission efficiency in dependence on a temperature of a fluid accommodated within the automatic transmission.

Owing to the arrangement mentioned above, the target driving power can accurately be corrected regardless of the temperature prevailing within the automatic transmission.

In still another preferred mode for carrying out the invention, the control unit may include a speed ratio arithmetic module for arithmetically determining a speed ratio on the basis of a ratio between an input speed and an output speed of the input clutch, and the transmission efficiency arithmetic module may determine arithmetically the transmission efficiency on the basis of the speed ratio.

With the arrangement of the automatic-transmission-equipped engine control system described above, there can be realized the control system which does not impair the driver's feeling of comfortableness and which can ensure the control of minimum fuel consumption.

In a further preferred mode for carrying out the invention, the transmission efficiency arithmetic module may be so designed as to impose limitation onto the transmission efficiency on the basis of the speed ratio.

With the arrangement described above, there can also be realized the control system which does not impair the driver's feeling of comfortableness.

In yet further preferred mode for carrying out the invention, the control unit may include a speed ratio arithmetic module for arithmetically determining a speed ratio on the basis of a ratio between an input speed and an output speed of the input clutch, and the target transmission input speed arithmetic module may be so designed as to multiply the target engine speed by the speed ratio to thereby determine arithmetically the target transmission input speed.

Owing to the arrangement of the automatic-transmission-equipped engine control system described above, there can be realized the control system which does not impair the driver's feeling of comfortableness and which can ensure the control at the minimum fuel consumption even in the nonlock-up state.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 19 is a view for illustrating variations in various speeds required for correction in the control system according to the seventh embodiment of the invention.

DESCRIPTION OF THE PREFERRED EMBODIMENTS

Figure 1:
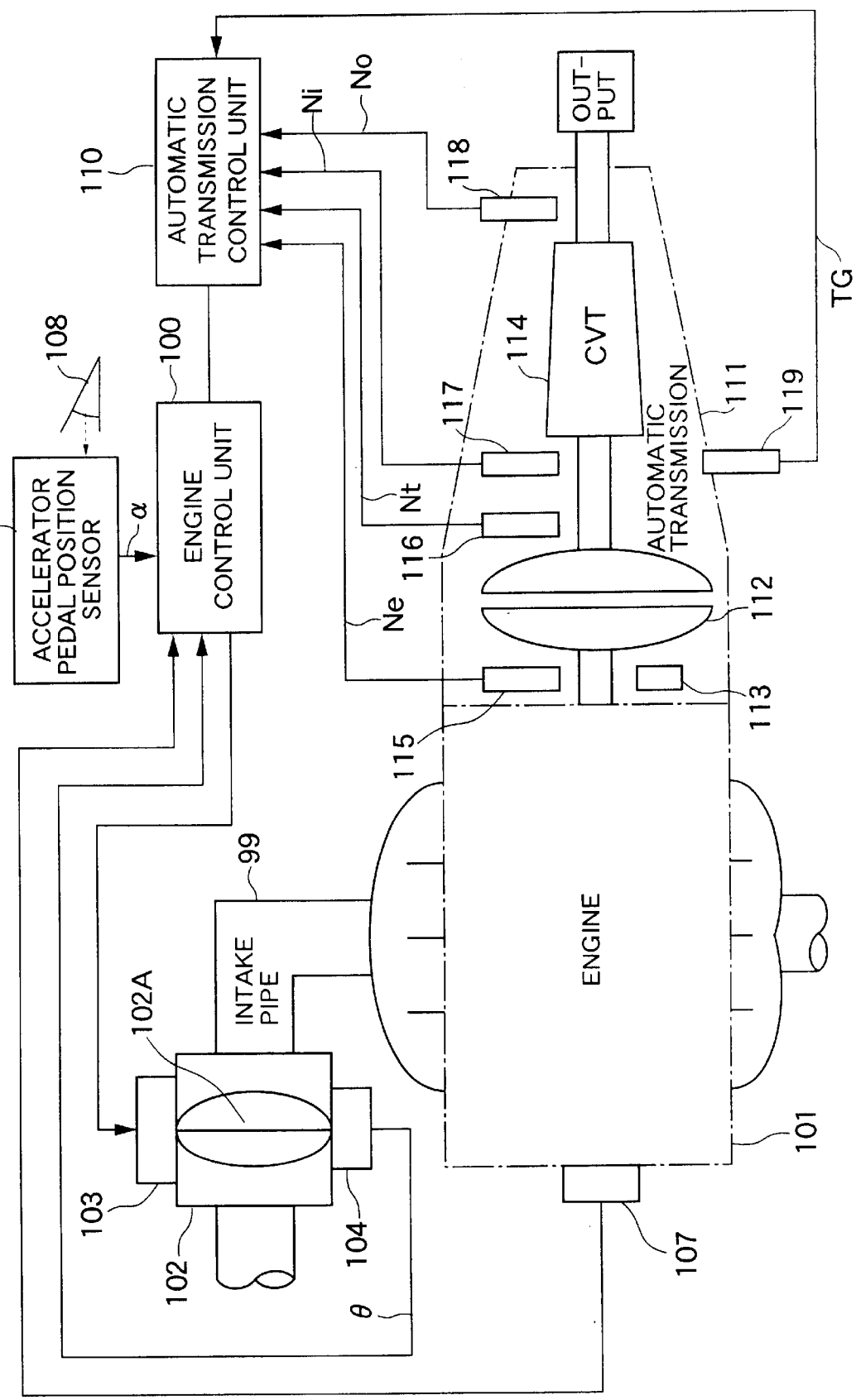
FIG. 1 is a view showing schematically a general arrangement of an internal combustion engine equipped with an automatic transmission to which the present invention can find application.

The present invention will be described in detail in conjunction with what is presently considered as preferred or typical embodiments thereof by reference to the drawings. In the following description, like reference characters designate like or corresponding parts throughout the several views.

Embodiment 1

Now, referring to the drawings, description will be made of a control system for an internal combustion engine equipped with an automatic transmission (hereinafter also referred to as the automatic-transmission-equipped engine control system) according to a first embodiment of the present invention. In the drawing, FIG. 1 is a functional block diagram showing schematically and generally a configuration of the automatic-transmission-equipped engine control system which is common to all the embodiments of the present invention, and FIG. 2 shows in a functional block diagram major components (engine control unit and an automatic transmission control unit) of the engine system shown in FIG. 1.

Figure 3:
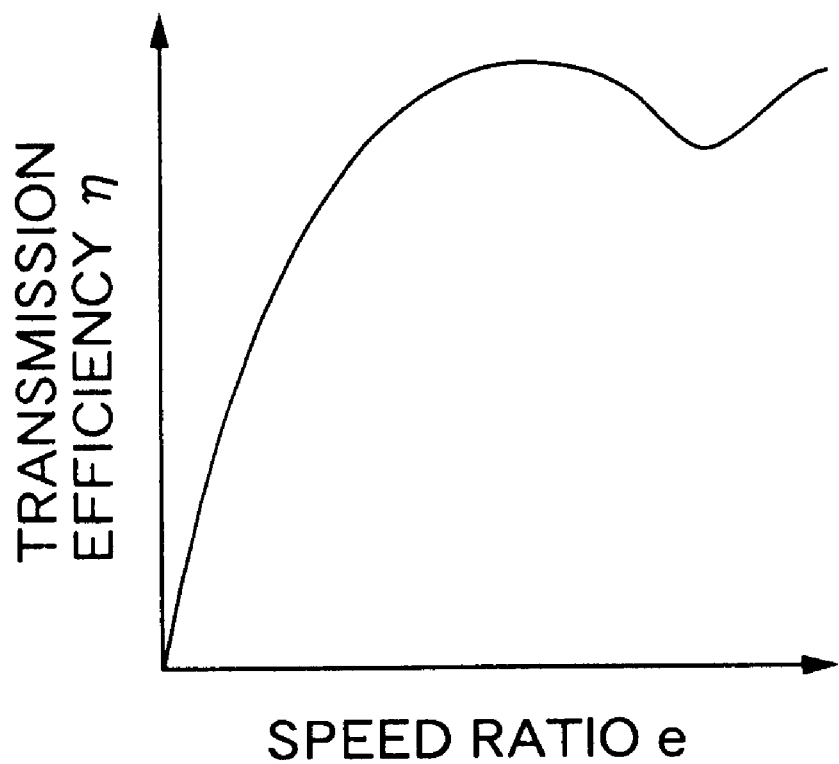
FIG. 3 is a characteristic diagram showing a relation between a speed ratio and a transmission efficiency of a torque converter which diagram is to be referenced in the description of a first embodiment of the present invention.

Further, FIG. 3 is a characteristic diagram for illustrating graphically a relation between a transmission efficiency η of a torque converter 112 and a speed ratio e between an input shaft and an output shaft of the torque converter. The speed ratio—versus—transmission efficiency characteristic data illustrated in FIG. 3 are stored in a memory or storage (not shown) of an electric control unit or ECU (not shown either) which constitutes a major part of in the engine control unit 100.

Figure 2:
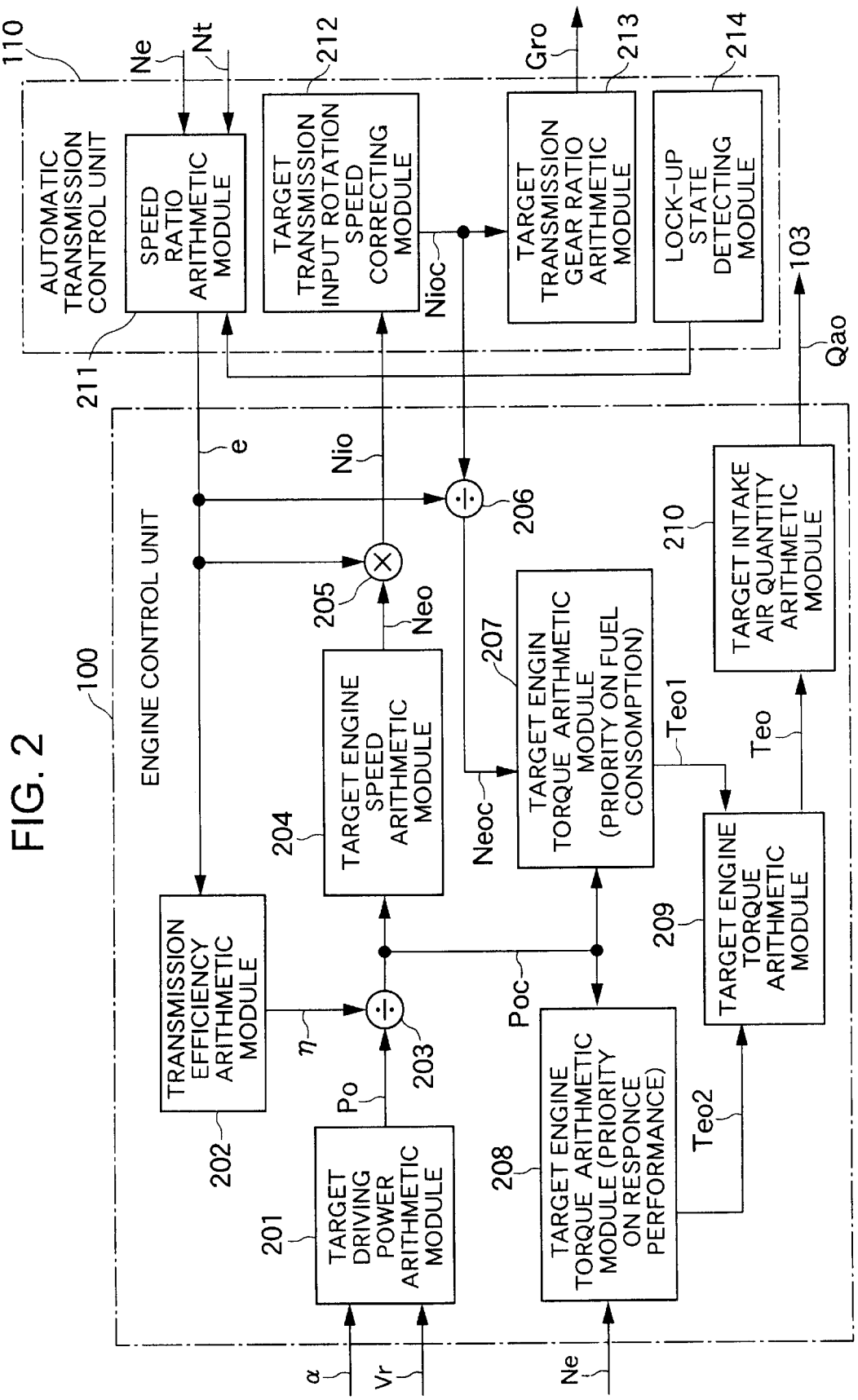
FIG. 2 is a functional block diagram showing a configuration of a control system for the engine/transmission system shown in FIG. 1 according to an embodiment of the present invention.

Referring to FIG. 1, there are shown an internal combustion engine (hereinafter also referred to simply as the engine) 101 which is controlled by the engine control unit 100, an automatic transmission 111 controlled by the automatic transmission control unit 110, the actuator for driving the engine 101 and a set of various types of sensors for detecting operating state of the engine 101.

The engine 101 is equipped with an intake pipe 99 in which an electronically controlled throttle 102 is installed for adjusting or regulating an intake air quantity Qa fed to the engine 101. The electronically controlled throttle 102 in turn is comprised of an electric motor 103 for driving a throttle valve element 102A of the electronically controlled throttle 102 and a throttle position sensor 104 for detecting an opening degree θ of the throttle valve element.

In each of the individual cylinders of the engine 101, a fuel injection valve and an ignition device including a spark plug (not shown) are mounted. Further, the engine 101 is provided with a temperature sensor (not shown) for detecting a temperature of cooling water of the engine 101, a vehicle speed sensor for detecting a vehicle speed Vr of a motor vehicle or car equipped with the engine/transmission system now under consideration, and others.

Mounted on a crank shaft of the engine 101 is a crank angle sensor 107 which serves as a reference position sensor for the control purpose and at the same time as a rotation sensor. A pulse signal (which may be termed the crank angle signal) generated by the crank angle sensor 107 is made use of in the engine control unit 100 for arithmetic determination of the timings for the fuel injection control purpose and for the ignition control purpose, respectively, and additionally for arithmetic determination of the engine speed or engine speed (rpm) Ne.

Provided in association with an accelerator pedal 108 which is manipulated by a driver of the motor vehicle is an accelerator pedal position sensor (APS) 109 for detecting magnitude of depression of the accelerator pedal 108 which will also be referred to as the depression stroke α.

Each of the engine control unit 100 and the automatic transmission control unit 110 is implemented in the form of an electronic control unit or ECU in short which includes a microcomputer or microprocessor. In the case of the illustrated engine/transmission system, the engine control unit 100 and the automatic transmission control unit 110 are assumed as being implemented discretely from each other and electrically interconnected. However, it goes without saying that they may be realized as a single control device of an integrated structure.

The engine control unit 100 is designed or programmed to control the actuators provided in association with the engine 101 such as, for example, the electric motor 103 for driving the electronically controlled throttle valve 102A, the fuel injection valves, the ignition devices and the like on the basis of the detection information derived from the outputs of the aforementioned various. types of sensors, which information indicates the operating state of the engine.

The automatic transmission 111 controlled by the automatic transmission control unit 110 is comprised of a torque converter 112 interposed between the input side (output shaft side of the engine 101) and the output side (turbine shaft side), a lock-up clutch (also may be referred to as the lock-up clutch) 113 for regulating the duty ratio of the coupling state of the torque converter 112, and a continuously variable transmission (CVT in short) 114 connected operatively to the torque converter 112 at the output side thereof for regulating the transmission gear ratio continuously in a stepless manner.

Although the output structure of the automatic transmission 111 is not shown in detail in FIG. 2, a reduction gear is connected to the output shaft of the continuously variable transmission or CVT 114 with tires of the wheels of the motor vehicle being connected thereto through the reduction gear.

The automatic transmission control unit 110 is designed or programmed to perform the duty-control of the lock-up clutch (lock-up clutch) 113 provided in association with the torque converter 112 within the automatic transmission 111 to thereby control the degree of coupling between the output shaft of the engine 101 and the turbine.

Complete lock-up of the torque converter 112 is effectuated by the lock-up clutch (or lock-up clutch) 113 when the lock-up duty ratio Du is controlled to a maximum value by means of the automatic transmission control unit 110, whereby the output shaft of the engine 101 at the input side of the torque converter and the turbine shaft at the output side of the torque converter are directly coupled or intercoupled. In this directly intercoupled state or locked-up state, the turbine speed Nt coincides with the engine speed (rpm) Ne.

In association with each of the shafts disposed internally of the automatic transmission 111, there are provided an engine rotation speed sensor 115 for detecting the engine speed or engine speed Ne (rpm), a turbine rotation speed sensor 116 for detecting a turbine speed or turbine speed Nt (rpm), an input rotation speed sensor 117 for detecting an input speed (primary speed) Ni (rpm) of the continuously variable transmission (CVT) 114, an output rotation speed sensor 118 for detecting an output speed No of the CVT 114 and hence that of the automatic transmission 111, and the temperature sensor 119 for detecting oil temperature TG of an coil accommodated within the automatic transmission 111.

The engine speed Ne is detected as the input speed Ni for the automatic transmission 111, while the turbine speed Nt is detected as the output speed No of the torque converter 112, wherein the input speed Ni and the output speed No are detected as the input speed and the output speed, respectively, of the continuously variable transmission or CVT 114.

At this juncture, it should be mentioned that the rotation speeds of the individual shafts provided in association with the engine 101 and the automatic transmission 111 internally thereof are represented in terms of speeds (rpm), respectively, only for convenience of the description.

Further, it should be added that there are provided as the other known sensors belonging to the so-called various sensors an air-flow sensor, sensors for detecting the operating states of supplementary components or machinery (such as electric loads and the like) of the engine and so forth.

The engine control unit 100 is designed to arithmetically determine a desired or target intake air quantity Qao on the basis of the various sensor output signals indicative of the engine operating state to thereby drive the electric motor 103 by issuing a command value indicative of the target intake air quantity Qao, whereby the throttle valve 102A of the electronically controlled throttle 102 is rotatively or swingably driven.

On the other hand, the automatic transmission control unit 110 serves for arithmetically determining the lock-up duty ratio Du and the desired or target transmission gear ratio Gro on the basis of the various sensor output signals indicative of the engine operating state, to thereby control the operating states of the lock-up clutch (lock-up clutch) 113 and the continuously variable transmission or CVT 114.

Referring to FIG. 2, the engine control unit 100 is comprised of a desired or target driving power arithmetic module 201, a transmission efficiency arithmetic module 202, a divider module 203 serving as a desired or target driving power correcting module, a desired or target engine speed arithmetic module 204, a multiplier module 205 serving as a desired or target transmission input speed arithmetic module, a divider module 206, a target engine torque arithmetic module 207 for arithmetically determining a desired or target engine torque with priority being put on the fuel-cost performance (or fuel consumption ratio), a desired or target engine torque arithmetic module 208 for arithmetically determining the target engine torque with priority put on the response performance, an ultimate target engine torque arithmetic module 209 for determining a final or ultimate target engine torque, and a desired or target intake air quantity arithmetic module 210.

On the other hand, the automatic transmission control unit 110 includes a speed ratio arithmetic module 211, a target transmission input speed correcting module 212, a target transmission gear ratio arithmetic module 213 and a lock-up state detecting module 214.

The target driving power arithmetic module 201 incorporated in the engine control unit 100 determines arithmetically a basic target driving power Po which is demanded by the driver on the basis of at least the accelerator pedal stroke signal α and the vehicle speed signal Vr among the engine operating state indicating signals.

The speed ratio arithmetic module 211 which constitutes a part of the automatic transmission control unit 110 is designed for computing the ratio of the turbine speed Nt to the engine speed Ne (i.e., Nt/Ne) in terms of a speed ratio e ($\leq 1$) between the input shaft and the output shaft of the torque converter 112.

The transmission efficiency arithmetic module 202 of the engine control unit 100 is designed to determine the transmission efficiency η of the torque converter 112 on the basis of the speed ratio e by referencing the map data represented by the characteristic curve illustrated in FIG. 3.

The divider module 203 is designed to divide the target driving power Po by the transmission efficiency η to thereby determine arithmetically a corrected target driving power Poc. On the other hand, the target engine speed arithmetic module 204 is designed to arithmetically determine on the basis of the corrected target driving power Poc such a target engine speed Neo which makes it possible to realize the corrected target driving power Poc with a minimum fuel consumption.

The multiplier module 205 is so designed as to determine arithmetically a target transmission input speed Nio by multiplying the target engine speed Neo by the speed ratio e. In other words, the target transmission input speed Nio of the continuously variable transmission (CVT) 114 is arithmetically so determined that the input speed of the automatic transmission 111 coincides with the target engine speed Neo.

The target transmission input speed correcting module 212 incorporated in the automatic transmission control unit 110 is so designed as to correct the target transmission input speed Nio on the basis of the engine operating state to thereby determine arithmetically a corrected target transmission input speed Nioc.

The target transmission gear ratio arithmetic module 213 is designed to determine arithmetically a target transmission gear ratio Gro on the basis of the corrected target transmission input speed Nioc, wherein the target transmission gear ratio Gro as determined is outputted to the continuously variable transmission (CVT) 114. In this manner, the transmission gear ratio Gr of the continuously variable transmission or CVT 114 is controlled in such a manner that the input speed Ni coincides with the corrected target transmission input speed Nioc.

The lock-up state detecting module 214 is designed to detect the lock-up state of the torque converter 112 on the basis of the speed ratio e of the torque converter 112 and the lock-up duty ratio Du for the lock-up clutch (lock-up clutch) 113.

The divider module 206 constituting a part of the engine control unit 100 is arranged to determine a corrected target engine speed Neoc by dividing the corrected target transmission input speed Nioc by the speed ratio e.

The target engine torque arithmetic module 207 imparted with the priority on the fuel-cost performance is designed to arithmetically determine a target engine torque Teo1 which can afford the corrected target driving power Poc with a minimum fuel consumption on the basis of the corrected target driving power Poc and the corrected target engine speed Neoc.

On the other hand, the target engine torque arithmetic module 208 which is designed to put priority on the response performance serves for arithmetically determining a target engine torque Teo2 which can afford speedily the corrected target driving power Poc in response to a demand, for example, for acceleration on the basis of the corrected target driving power Poc and the engine speed Ne.

The target engine torque arithmetic module 209 is designed for selecting the target engine torque Teo1 with priority on the fuel-cost performance or alternatively the target engine torque Teo2 with priority on the response performance in dependence on the engine operating state, to thereby output the ultimate target engine torque Teo.

The target intake air quantity arithmetic module 210 determines arithmetically the target intake air quantity Qao for realizing the target engine torque Teo to supply to the electric motor 103 of the electronically controlled throttle 102 a driving signal which conforms to the target intake air quantity Qao as determined. In this manner, the actual intake air quantity Qa of the engine 101 is so controlled as to coincide with the target intake air quantity Qao.

The target engine speed arithmetic module 204, the multiplier module 205, the divider module 206, the target engine torque arithmetic module 207, the target engine torque arithmetic module 208 and the target engine torque arithmetic module 209 cooperate to constitute a target value selecting means for selecting a combination of the corrected target engine speed Neoc and the target engine torque Teo for making available the corrected target driving power Poc.

Now, operations of the automatic-transmission-equipped engine control system according to the first embodiment of the invention will be described in detail by referring to flow charts shown in FIGS. 4 to 6 together with FIGS. 1 to 3. Incidentally, in FIGS. 5 and 6, similar processing steps are denoted by like reference characters and repetitional description in detail of these steps will be omitted.

Figure 4:
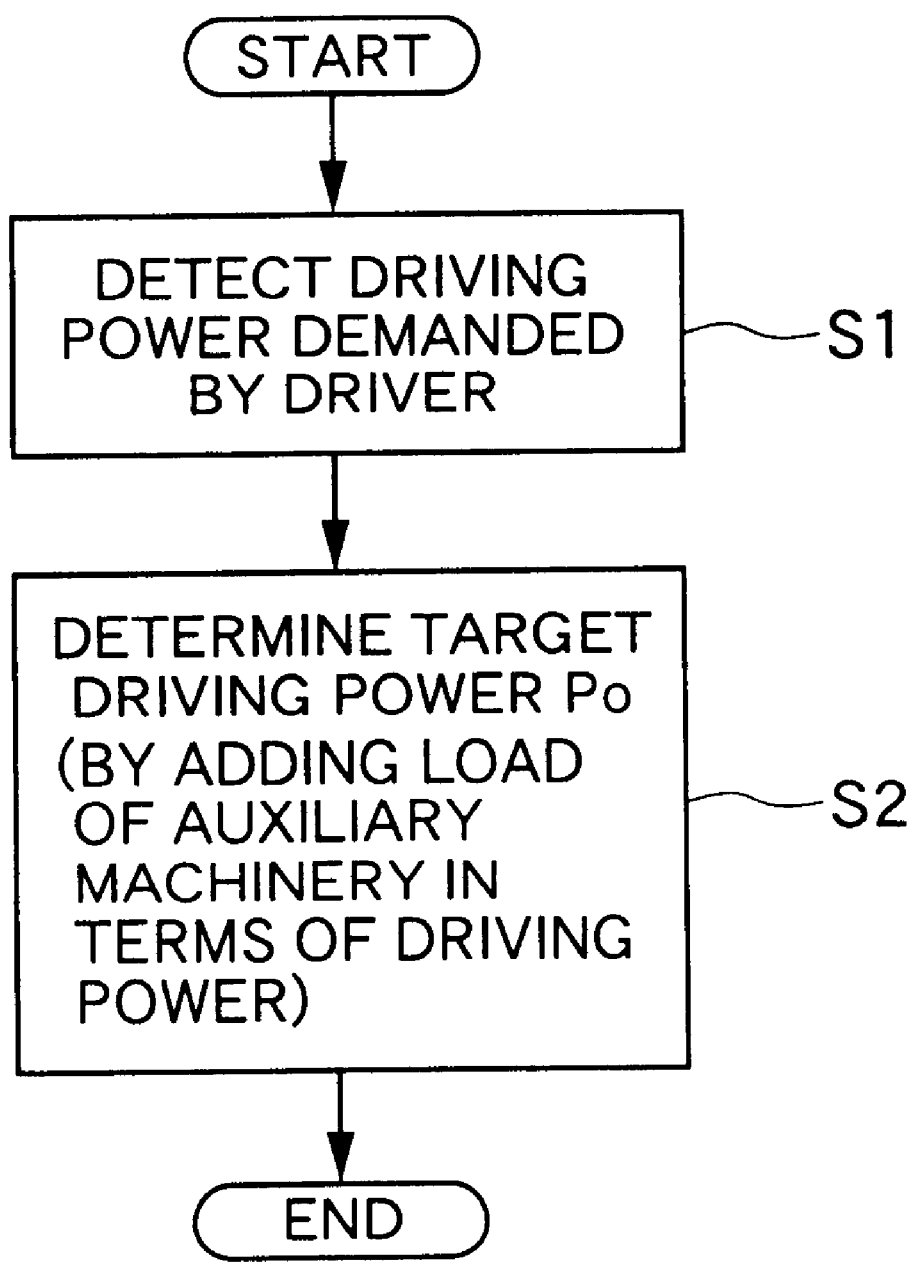
FIG. 4 is a flow chart for illustrating operation of a target driving power arithmetic module according to the first embodiment of the invention.
Figure 5:
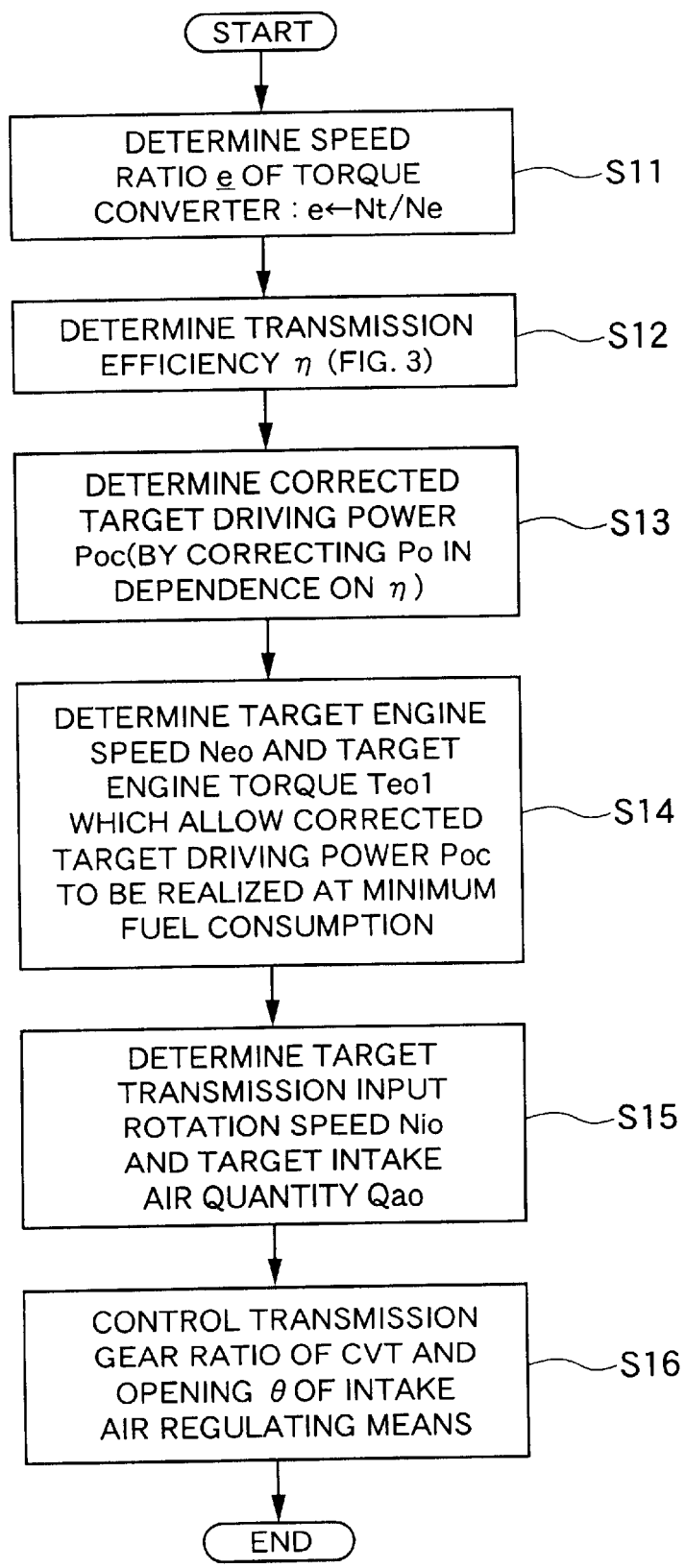
FIG. 5 is a flow chart for illustrating various arithmetic and control operations according to the first embodiment of the invention.
Figure 6:
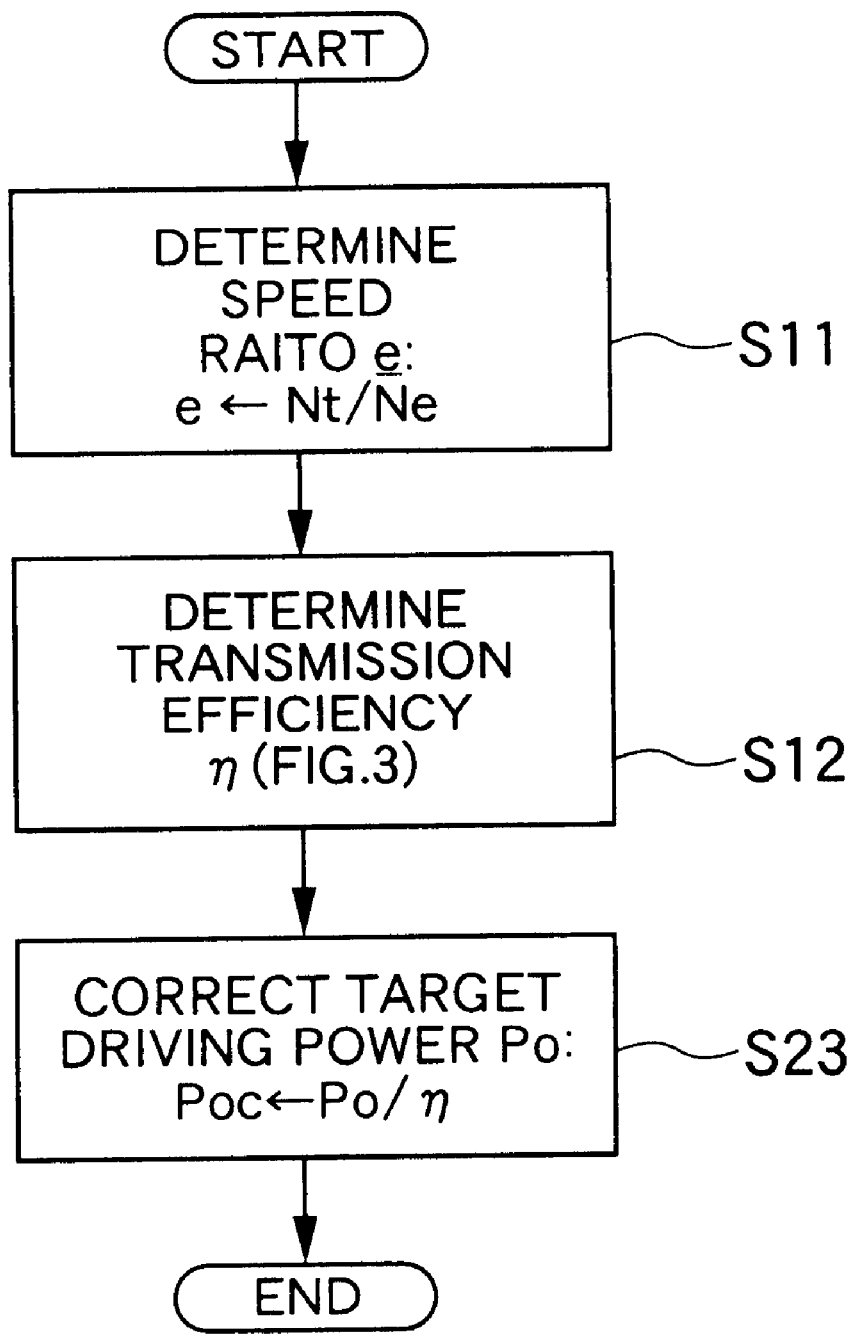
FIG. 6 is a flow chart for illustrating in concrete operation for correcting target driving power in accordance with the transmission efficiency according to the first embodiment of the invention.

In the figures, FIG. 4 shows a flow chart for illustrating operation of the target driving power arithmetic module 201, FIG. 5 shows a flow chart for illustrating operations of the speed ratio arithmetic module 211 and the loop extending from the transmission efficiency arithmetic module 202 to the target intake air quantity arithmetic module 210, and FIG. 6 is a flow chart for illustrating in concrete the operation of the divider module 203.

Now referring to FIG. 4, the target driving power arithmetic module 201 detects at first a driving power demand commanded by the driver on the basis of the accelerator pedal stroke α and the vehicle speed Vr or the like (step S1). In succession, the operating state of the auxiliary machinery (loads) provided for the engine is converted into the equivalent driving power of the engine to thereby determine a basic target driving power Po by correcting the driving power demanded by the driver in view of the equivalent driving power mentioned above (step S2).

On the other hand, the speed ratio arithmetic module 211 of the automatic transmission control unit 110 determines arithmetically the speed ratio e (=Nt/Ne) of the torque converter 112 (step S11), as shown in FIG. 5. In succession, the transmission efficiency arithmetic module 202 determines the transmission efficiency η of the torque converter 112 on the basis of the speed ratio e by referencing the map data of the characteristic curve illustrated in FIG. 3 (step S12).

Subsequently, the target driving power correcting module (i.e., the divider 203) corrects the target driving power Po by taking into account the transmission efficiency η to thereby determine arithmetically the corrected target driving power Poc (step S13).

The target engine speed arithmetic module 204, the multiplier module 205, the divider module 206 and the target engine torque arithmetic module 207 cooperate to arithmetically determine the corrected target engine speed Neoc and the target engine torque Teo1 in order to allow the corrected target driving power Poc to be available at a minimum fuel consumption (step S14).

On the other hand, the target transmission input speed arithmetic module (multiplier module 205) determines arithmetically the target transmission input speed Nio on the basis of the target engine speed Neo and the speed ratio e while the target intake air quantity arithmetic module 210 arithmetically determines the target intake air quantity Qao on the basis of the target engine torque Teo (step S15).

Finally, the target transmission gear ratio arithmetic module 213 outputs such a control signal which causes the transmission gear ratio Gr of the continuously variable transmission or CVT 114 to coincide with the target transmission gear ratio Gro, and the target intake air quantity arithmetic module 210 in turn controls the throttle valve opening degree θ of the intake air quantity regulating means (i.e., electronically controlled throttle 102) so that the intake air quantity Qa of the engine 101 coincides with the target intake air quantity Qao (step S16).

Figure 15:
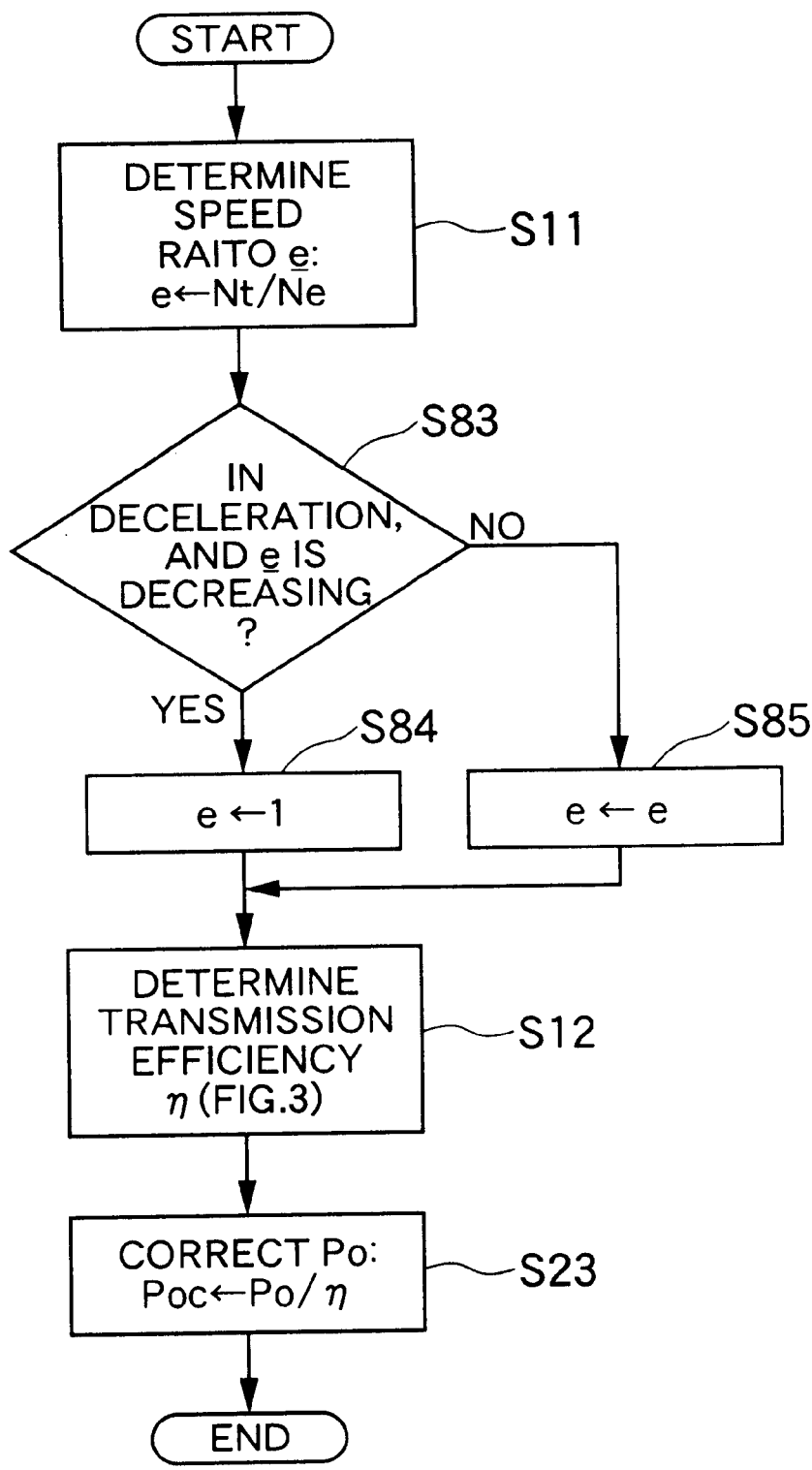
FIG. 15 is a flow chart for illustrating a speed ratio correcting operation in a transient operation state according to the sixth embodiment of the invention.

Next referring to FIG. 6, a step S23 shown therein corresponds to the step S13 shown in FIG. 15, wherein the divider module 203 is practically so designed as to determine the corrected target driving power Poc by dividing the target driving power Po by the transmission efficiency η (step S23).

In this manner, even when the torque converter 112 is in the nonlock-up state and even if such situation is prevailing in which the output torque of the engine 101 is transmitted toward the turbine shaft (transmission) through the torque converter 112 at the transmission efficiency η which is smaller than 100%, the driving power demand of the driver can be satisfied.

More specifically, by correcting the target driving power Po in consideration of the transmission efficiency η of the torque converter 112, the fuel-cost performance improvement control can be realized owing to optimalization of the operation range, whereby the engine and hence motor vehicle equipped therewith can be driven at the operation point which corresponds to the minimum fuel consumption even in the nonlock-up region of the torque converter 112.

Besides, by correcting the transmission efficiency η (or the speed ratio e), degradation of the driving comfortableness of the driver can be evaded.

Additionally, by dividing the corrected target transmission input speed Nioc by the speed ratio e by means of the divider module 206 to thereby determine the corrected target engine speed Neoc, there can be acquired the corrected target engine speed Neoc which reflects the actual status of the automatic transmission 111 after the various corrections mentioned previously.

In the foregoing description, it has been assumed that the torque converter 112 is employed as the input clutch of the automatic transmission 111. However, it goes without saying that substantially same or equivalent advantageous effects can be ensured even when an electromagnetic clutch, a friction clutch or the like is employed as the input clutch for the automatic transmission 111.

Embodiment 2

In the case of the automatic-transmission-equipped engine control system according to the first embodiment of the invention, no consideration is paid to the arithmetically determination of the transmission efficiency η in dependence on the engine operating state. However, the transmission efficiency η should preferably be determined and corrected in view of the engine operating state. By way of example, in the automatic-transmission-equipped engine control system according to the first embodiment of the invention, no lower limit value is provided for the transmission efficiency η. However, in consideration of the corrective division of the target driving power Po is performed by the divider module 203, it is preferred to set the lower limit value for the transmission efficiency η in order to prevent or suppress divergence of the result of the corrective arithmetic operation. The second embodiment of the invention is directed to the automatic-transmission-equipped engine control system in which the lower limit value for the transmission efficiency η is employed in the arithmetically determination thereof.

Figure 7:
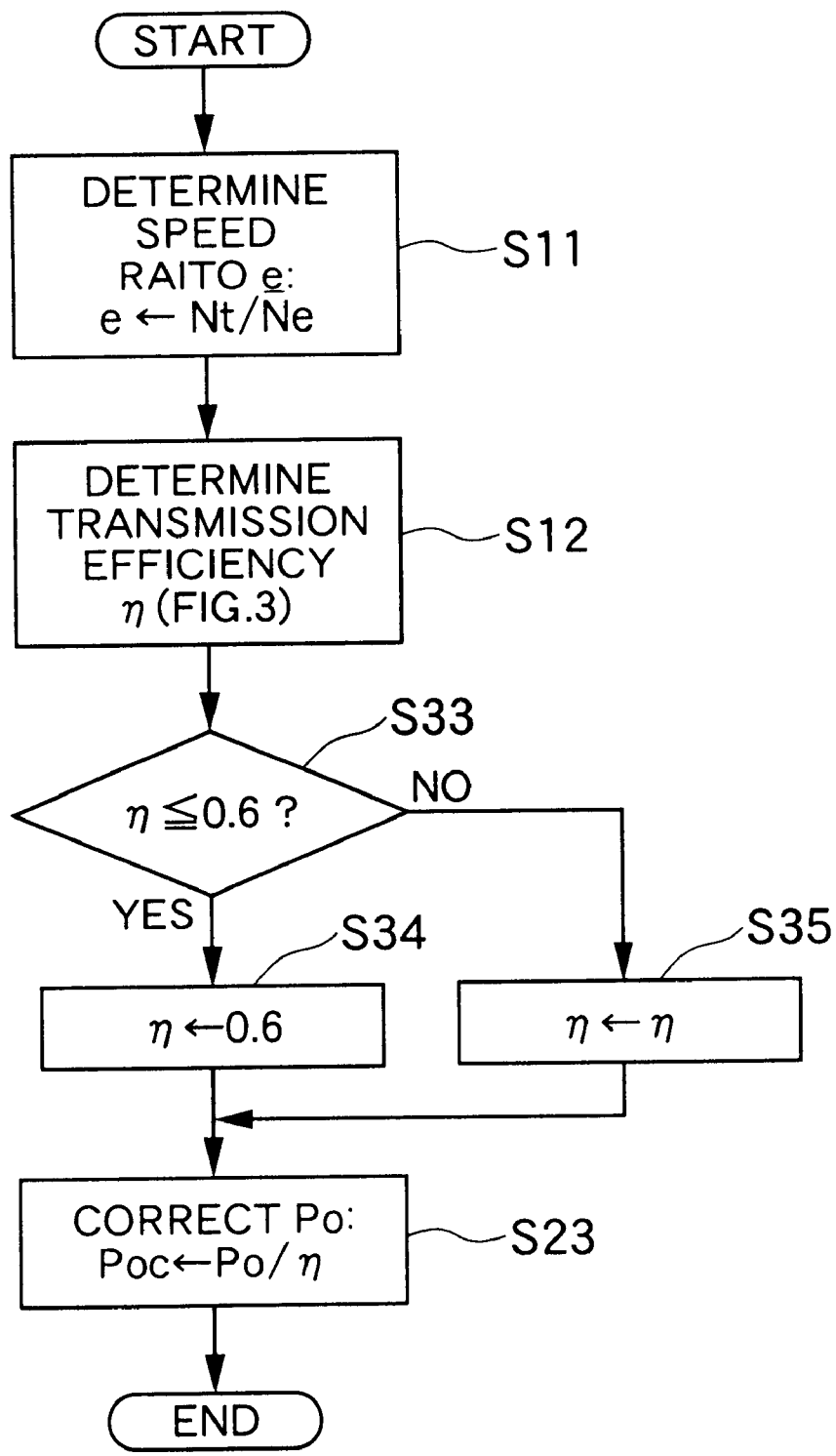
FIG. 7 is a flow chart for illustrating a processing procedure for correction of transmission efficiency upon lowering thereof according to a second embodiment of the present invention.

FIG. 7 shows a flow chart for illustrating a processing procedure for arithmetic determination of the transmission efficiency with a lower limit value being set for the transmission efficiency η in the automatic-transmission-equipped engine control system according to the second embodiment of the present invention. Parenthetically, in the flow chart shown in FIG. 7, the steps same as or corresponding to those described hereinbefore by reference to FIGS. 5 and 6 are designated by like reference characters.

Figure 8:
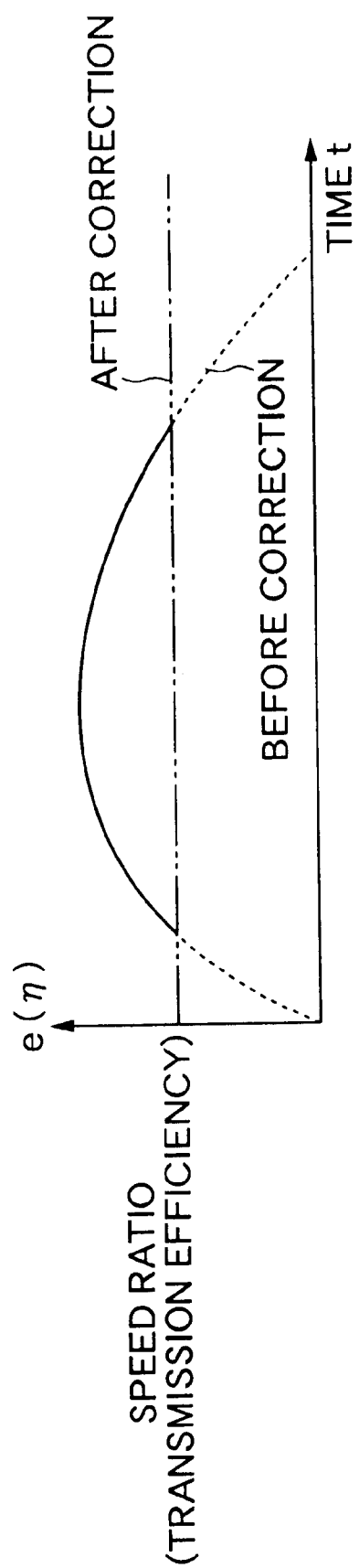
FIG. 8 is a view for graphically illustrating the processing procedure for correction of transmission efficiency upon lowering thereof according to the second embodiment of the invention.

Further, FIG. 8 is a view for graphically illustrating change of the transmission efficiency η (speed ratio e) as a function of time lapse in the automatic-transmission-equipped engine control system, wherein change of the transmission efficiency η before correction is indicated by a broken line curve while change of the transmission efficiency η after the correction with the lower limit value being set is indicated by a solid line curve.

At this juncture, it should be mentioned that since the transmission efficiency η bears correspondence relation to the speed ratio e (refer to FIG. 3), the speed ratio e may be taken along the ordinate in FIG. 8 in place of the transmission efficiency η. Of course, the transmission efficiency η may be taken along the ordinate.

Further, the configuration of the control system for the internal combustion engine equipped with automatic transmission according to the second embodiment of the invention is similar to that described hereinbefore by reference to FIG. 1 and FIG. 2.

In the case of the automatic-transmission-equipped engine control system according to the instant embodiment of the invention, the transmission efficiency arithmetic module 202 includes a lower limit value setting means for setting the lower limit value of the transmission efficiency η of the torque converter 112. This lower limit value setting means is designed to set the transmission efficiency η to a given constant value when the transmission efficiency η is lower than a predetermined value (lower limit value) for thereby limit the transmission efficiency η to a value greater than the given constant value inclusive thereof.

In FIG. 7, the transmission efficiency arithmetic module 202 makes decision in a step S33 as to whether the transmission efficiency η is smaller than the lower limit value (e.g. 60%=0.6) inclusive thereof in succession to the step S12 where the transmission efficiency η is determined by reference to the map data (or transmission efficiency—versus—speed ratio characteristic data) illustrated graphically in FIG. 3.

When it is decided in the step S33 that η≦0.6 (i.e., when the step S33 results in affirmation "YES"), the transmission efficiency η is set to the lower limit value (=0.6) in a step S34, whereas the transmission efficiency η arithmetically determined in the step S12 is set, as it is, as the transmission efficiency η in the case where the decision step S33 results in negation "NO", i.e., when it is decided in the step S33 that η>0.6. (step S35).

In this manner, the transmission efficiency η is fixedly set to the lower limit value (indicated by a double-dotted broken line) in a region not exceeding the lower limit value (refer to broken line curve), whereas in a region exceeding the lower limit value, the value of the transmission efficiency η as determined arithmetically (refer to a solid line curve) is set intactly.

Consequently, even when the transmission efficiency η determined by referencing the map data (transmission efficiency—versus—speed ratio characteristic data) illustrated in FIG. 3 is of a low value (e.g. approximately 0%), correction of the target driving power Po by division by the intact transmission efficiency η is prevented, which in turn means that infinite divergence of the corrected target driving power Poc can positively be prevented, whereby the target driving power Poc can be corrected with sufficient accuracy.

In succession, processing for correcting the target driving power Po (step S23) is executed, whereby transmission gear ratio Gr of the continuously variable transmission or CVT 114 and the intake air quantity Qa of the engine 101 are controlled to the respective target values.

Embodiment 3

In the case of the automatic-transmission-equipped engine control system according to the second embodiment of the invention, the transmission efficiency η is set to a value not smaller than the lower limit value. However, the transmission efficiency η may be set to a given constant value in dependence on the engine operating state. More specifically, when the engine operating state indicates that the engine rotation speed is lowering or decreasing and/or when the speed ratio η or the transmission efficiency η is decreasing or lower than a predetermined value inclusive, the transmission efficiency η may preferably be set fixedly to the given constant value to thereby put preference to the driving comfortableness of the motor vehicle equipped with the engine now concerned rather than the correcting arithmetic operation. The automatic-transmission-equipped engine control system according to a third embodiment of the present invention is based on this concept.

Figure 9:
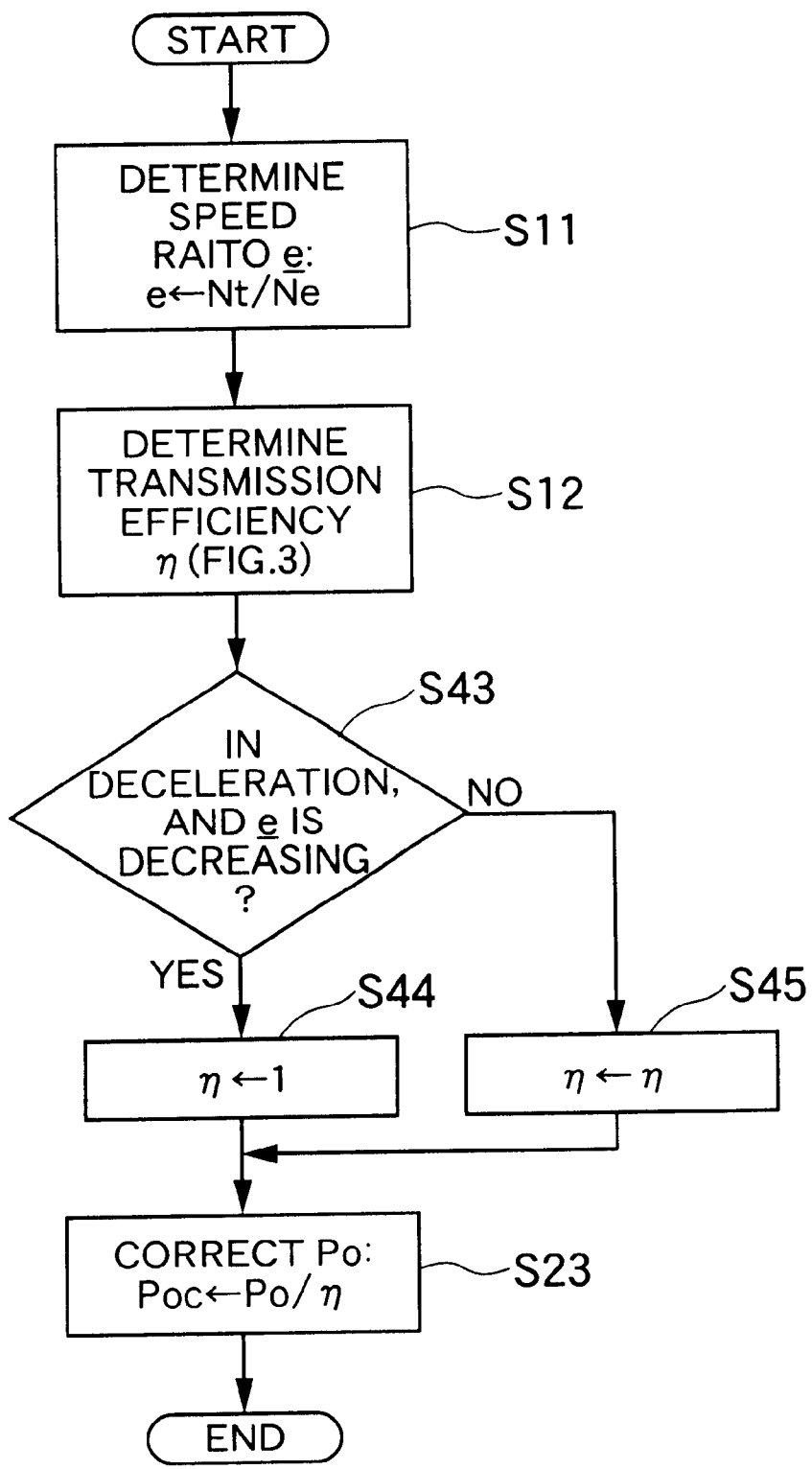
FIG. 9 is a flow chart for illustrating transmission efficiency correcting operation carried out in a transient engine operating sate according to a third embodiment of the present invention.
Figure 10A:
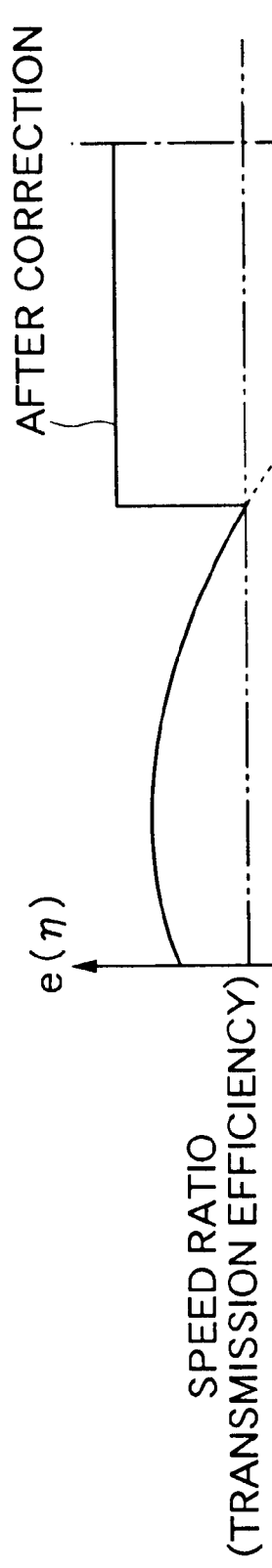
FIGS. 10A and 10B are views for graphically illustrating the transmission efficiency correcting operation carried out in the transient engine operating sate according to the third embodiment of the invention.
Figure 10B:
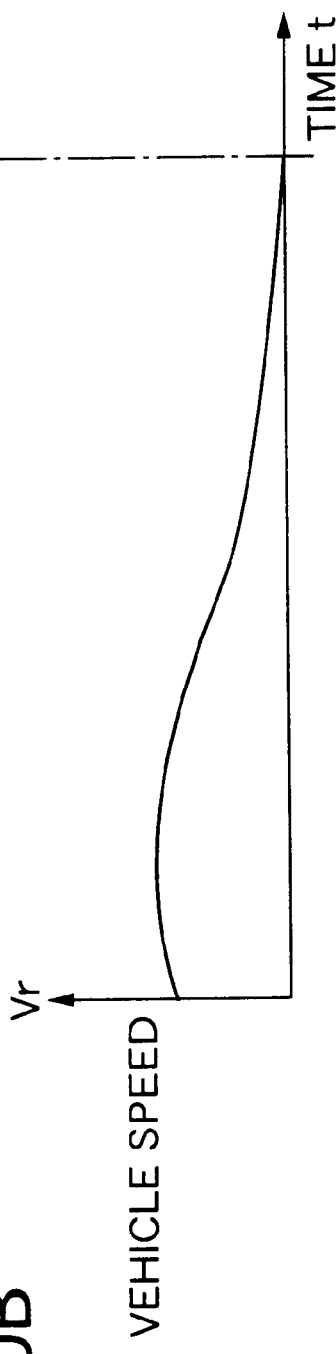

FIG. 9 is a flow chart for illustrating the transmission efficiency arithmetic operation executed in an automatic-transmission-equipped engine control system according to the third embodiment of the present invention, and FIGS. 10A and 10B are views for graphically illustrating change of the transmission efficiencyη (speed ratio e) and change of the vehicle speed Vr, respectively, as a function of time lapse.

It should first be mentioned that FIGS. 9 and 10 correspond, respectively, to FIGS. 7 and 8 described hereinbefore.

By the way, FIGS. 10A and 10B illustrate correcting operation performed when the transmission efficiency η is fixed to a given constant value (e.g. 1 (one)) at the time point when the speed ratio e (transmission efficiency η) has deceased to or smaller than a predetermined value during lowering of the vehicle speed Vr (i.e., during the deceleration of the motor vehicle).

Further, the configuration of the control system for the internal combustion engine equipped with automatic transmission according to the third embodiment of the invention is similar to that described hereinbefore by reference to FIG. 1 and FIG. 2.

The automatic-transmission-equipped engine control system now concerned is so arranged as to correct the transmission efficiency η in accordance with the operating state to thereby set the transmission efficiency η to a given constant value (e.g. 1=100%) in response to the transient operation state.

Now referring to FIG. 9, the transmission efficiency arithmetic module 202 is so designed as to first determine arithmetically the transmission efficiency η in the step S12 and then make decision whether or not the operating state of the engine 101 is in a decelerating mode or alternatively whether or not the speed ratio e of the torque converter 112 is decreasing (or has decreased to or smaller than the predetermined value) in a step S43.

When it is detected in the step S43 that the engine 101 is decelerating or the speed ratio e is decreasing (or the speed ratio e is not greater than the predetermined value) and thus when decision is made that the engine 101 is in the transient operation state (i.e., when the decision step S43 results in affirmation "YES"), the transmission efficiency arithmetic module 202 sets the transmission efficiency η to a given constant value (e.g. 1 (one)) (step S44).

On the other hand, when it is detected in the step S43 that the engine 101 is not decelerating and the speed ratio e is not decreasing (or the speed ratio e is greater than the predetermined value) and when the decision step S43 results in negation "NO", the transmission efficiency arithmetic module 202 sets the transmission efficiency η determined arithmetically in the step S12, as it is, as the transmission efficiency η (step S45).

Subsequently, the processing proceeds to the step S23 for correcting the target driving power Po.

As will be appreciated from the above, when it is decided that the operating state of the engine 101 is in the deceleration mode or the speed ratio e between the input element and the output element of the input clutch (i.e., torque converter 112) is decreasing or that the speed ratio e is not greater than the predetermined value, the transmission efficiency arithmetic module 202 sets the transmission efficiency η to a given constant value (e.g. 1 (one)).

Assuming, by way of example only, that the transmission efficiency η is very small as compared with the predetermined value, correction of the target driving power Po by making use of the transmission efficiency η by means of the divider module 203 will result in that the corrected target driving power Poc tends to increase (i.e., in the sense in which the deceleration becomes dull or lower), which in turn means that the comfortableness of the driver in driving his or her car in the deceleration mode will be degraded more or less.

However, by limiting the transmission efficiency η to the given constant value (e.g. 1 (one)), the target driving power Po can properly be corrected over the whole operation range by making use of the transmission efficiency η without impairing comfortableness of the driver's feeling during the deceleration mode.

In the foregoing description of the automatic-transmission-equipped engine control system according to the third embodiment of the present invention, it has been presumed that the given constant value for the transmission efficiency η is "1" (one) (=100%). It should however be appreciated that the present invention is never restricted thereto but can equally apply valid even if the given constant value is a smaller value than "1" (one), e.g. 0.6 or so, as described hereinbefore in conjunction with the second embodiment of the present invention.

Embodiment 4

In the automatic-transmission-equipped engine control system according to the first embodiment of the present invention, no consideration is paid to the arithmetic determination of the transmission efficiency η in the complete lock-up state of the torque converter 112. In this conjunction, it should be mentioned that the correction of the target driving power Po by using the transmission efficiency η in the complete lock-up state may undesirably incur degradation of the driving comfortableness. Accordingly, the fruitless correction of the target driving power Po in the complete lock-up state should preferably be avoided. This concept is implemented as a fourth embodiment of the present invention.

Figure 11:
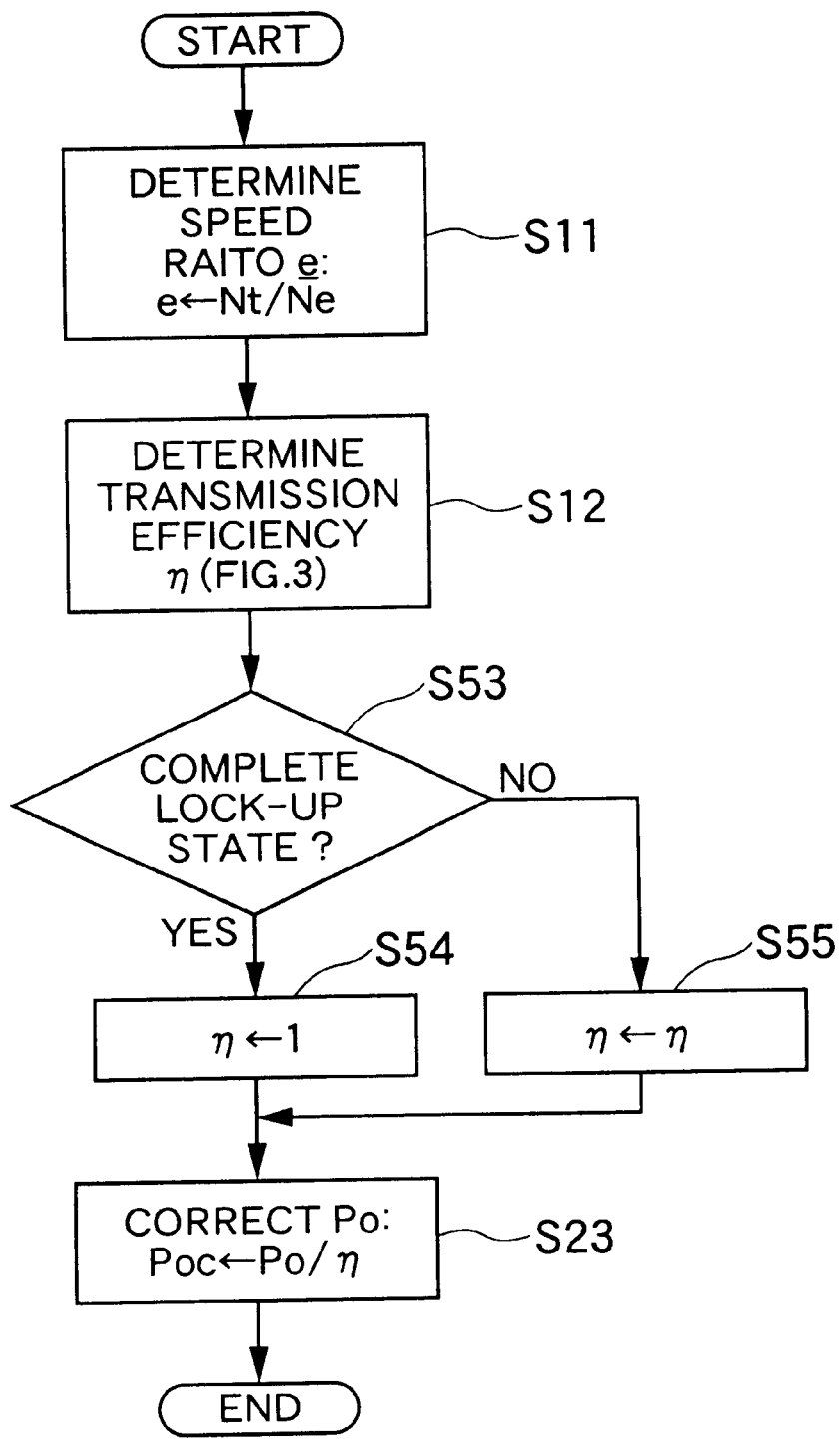
FIG. 11 is a flow chart for illustrating transmission efficiency correction inhibit operation in a complete lock-up state of transmission according to a fourth embodiment of the present invention.

FIG. 11 is a flow chart for illustrating the transmission efficiency arithmetic operation of the automatic-transmission-equipped engine control system according to a fourth embodiment of the present invention in which the correcting arithmetic operation with the transmission efficiency η is substantially inhibited in the complete lock-up state. In the case of the automatic-transmission-equipped engine control system now concerned, it is presumed, by way of example, that the transmission efficiency η is fixedly set to a given constant value (=1) in the complete lock-up state for inhibiting essentially the correcting arithmetic operation of the target driving power Po.

Figure 12A:
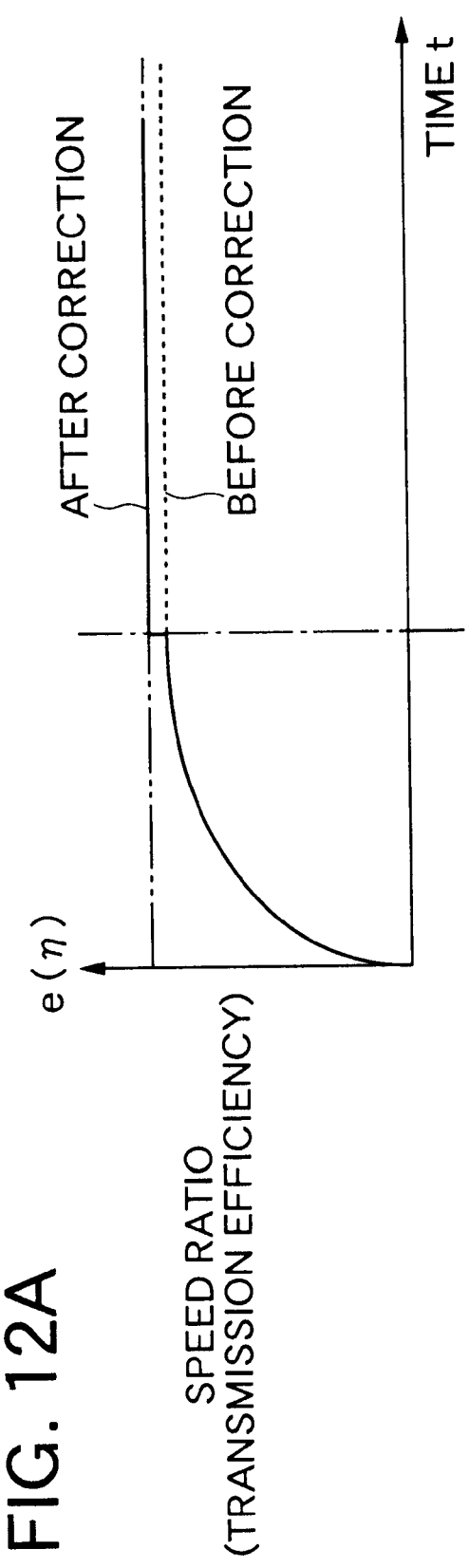
FIGS. 12A and 12B are views for graphically illustrating the transmission efficiency correction inhibit operation in the complete lock-up state of transmission according to the fourth embodiment of the invention.
Figure 12B:
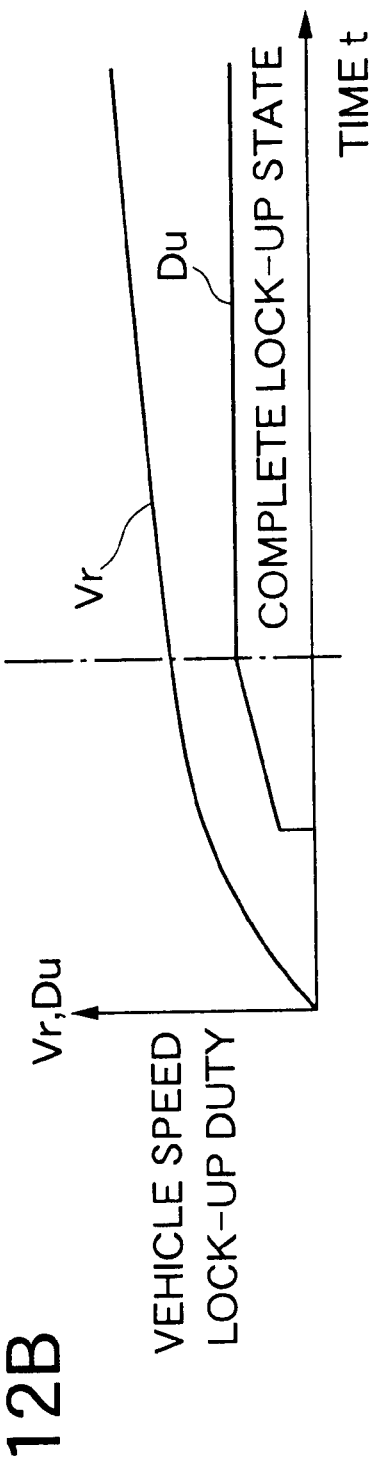

FIGS. 12A and 12B are views for graphically illustrating changes of the transmission efficiency η (speed ratio e), the vehicle speed Vr and the lock-up duty ratio Du, respectively, as a function of the time lapse, FIG. 11 is a flow chart corresponding to that of FIG. 9 and FIGS. 12A and 12B are characteristic diagrams similar to those shown in FIGS. 10A and 10B, respectively. More specifically, FIGS. 12A and 12B are views for illustrating correcting operations in the case where the transmission efficiency η (or the speed ratio e) is fixedly set to a given constant value (e.g. "1" (one)), i.e., in the case where the correcting arithmetic operation based on the transmission efficiency η is inhibited, when the complete lock-up state is detected.

Parenthetically, the configuration of the automatic-transmission-equipped engine control system is similar to that described hereinbefore by reference to FIGS. 1 and 2.

Referring to FIG. 11, the transmission efficiency arithmetic module 202 (or the speed ratio arithmetic module 211) makes decision in a step S53 as to whether or not the detection signal outputted from the lock-up state detecting module 214 indicates the complete lock-up state in succession to the arithmetic determination of the transmission efficiency η in a step S12.

When the complete lock-up state is decided in the step S53 (i.e., when the decision step S53 results in that the complete lock-up state has been established, i.e., "YES", the transmission efficiency η (or the speed ratio e) is fixedly set to a given constant value (=1) (step S54).

Thus, in the complete lock-up state, the transmission efficiency arithmetic module 202 sets the transmission efficiency η to a given constant value (=100%) in dependence on the speed ratio e (=1) to thereby inhibit the correction of the target driving power Po by the transmission efficiency η.

On the other hand, when the complete lock-up state is decided in the step S53, i.e., when the decision step S53 results in negation "NO", the transmission efficiency η (or the speed ratio e) determined arithmetically is intactly set as the transmission efficiency η (or the speed ratio e) (step S55).

In this conjunction, the lock-up state detecting module 214 serves for comparing, for example, the engine speed (rpm) Ne and the turbine speed Nt (or the input speed Ni to the CVT or continuously variable transmission 114 with a predetermined speed ΔN (e.g. 20 rpm), as a result of which the complete lock-up state is detected when the condition given by the undermentioned expression (1) is satisfied.

$$Ne-Nt \leq \Delta N \quad (1)$$

The reason why the predetermined speed ΔN is taken into consideration in the above expression (1) can be explained by the fact that because error or difference in the speed (=Ne−Nt) between the input shaft and the output shaft of the torque converter 112 exists unavoidably and never becomes zero in the strict sense because even in the complete lock-up state, there may exist mechanical errors, noise, etc.

Furthermore, even if the torque converter 112 is in the completely intercoupled range (complete lock-up state) a so-called slip-accompanying lock-up state in which slip corresponding to several speed can occur may be realized with a view to enhancing the driver's comfortableness. Thus, the transmission efficiency η as determined arithmetically can not always precisely the value of 100% but contain errors of several percentages as upper and lower margins, respectively.

Such being the circumstances, the complete lock-up state of the torque converter 112 is decided so long as the difference of speed (=Ne−Nt) is not greater than the predetermined speed ΔN.

In this manner, at the time point when the complete lock-up state is detected, the transmission efficiency η is fixed to "1" (=100%), whereby correction of the target driving power Po by the transmission efficiency η is inhibited.

Since the invalid correction for the target driving power Po can be avoided in the complete lock-up state of the torque converter, there will arise no such situation that the output torque of the engine 101 is set to an excessively large value which may unwantedly impair the car driving comfortableness.

In the foregoing, it has been described that the transmission efficiency η is set to "1" (one) (=100%) in order to inhibit the correction of the target driving power Po in the complete lock-up state. It should however be understood that the correcting arithmetic operation may be inhibited straightforwardly in response to the detection signal of the complete lock-up state.

Embodiment 5

In the case of the control system for the internal combustion engine equipped with the automatic transmission according to the first to fourth embodiments of the present invention described so far, no consideration is paid to the temperature TG of lubricant or oil employed in the torque converter 112. However, the transmission efficiency η should preferably be corrected in dependence on the oil temperature. A fifth embodiment of the invention is directed to the correction or corrective modification of the transmission efficiency η on the basis of the oil temperature TG.

Figure 13:
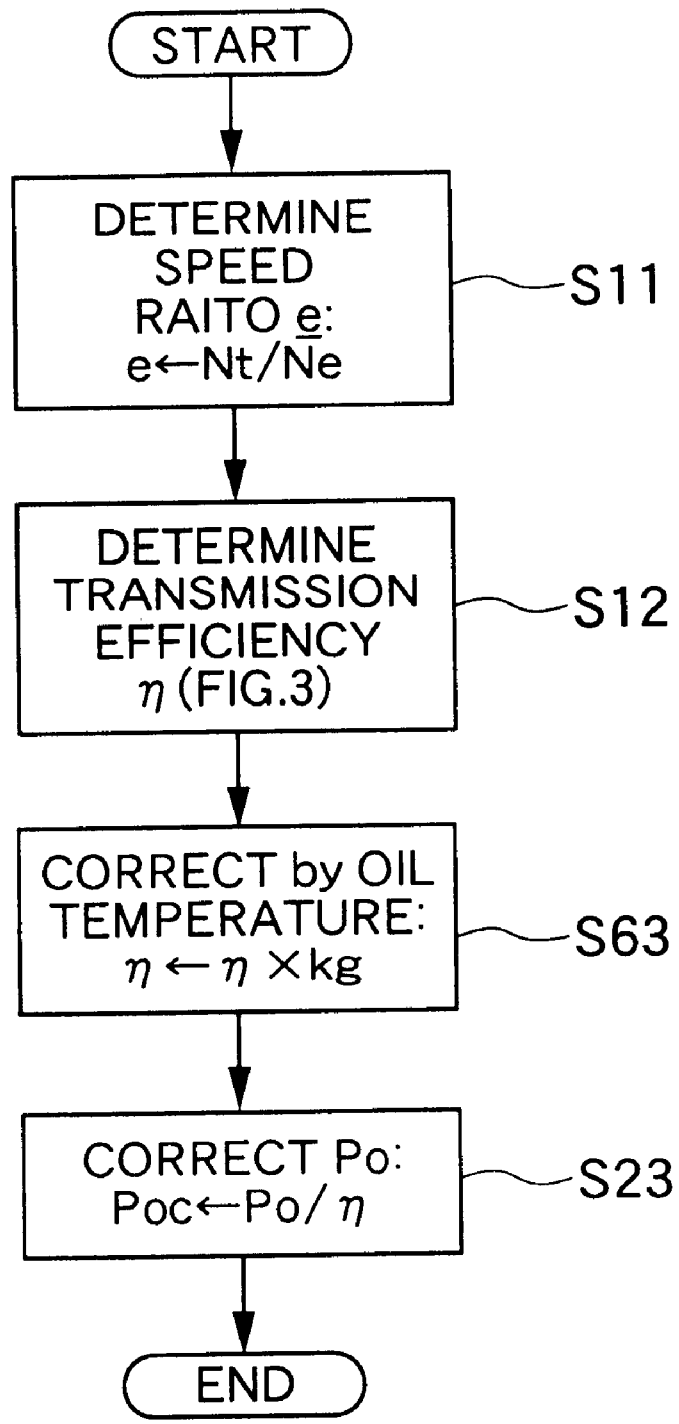
FIG. 13 is a flow chart for illustrating a processing procedure for correcting a transmission efficiency in dependence on an oil temperature according to a fifth embodiment of the present invention.

FIG. 13 is a flow chart for illustrating the transmission efficiency arithmetic executed in the automatic-transmission-equipped engine control system according to the fifth embodiment of the invention in which the transmission efficiency η is corrected in dependence on the oil temperature within the automatic transmission 111. Incidentally, configuration of the control system for the internal combustion engine equipped with the automatic transmission according to the instant embodiment of the invention is similar to that described hereinbefore in conjunction with FIGS. 1 and 2.

In the control system for the internal combustion engine equipped with the automatic transmission now under consideration, the transmission efficiency arithmetic module 202 is so designed as to correct or modify the transmission efficiency η in dependence on the oil temperature TG which is prevailing within the automatic transmission 111 and which is detected by means of the temperature sensor 119.

Referring to FIG. 13, the transmission efficiency arithmetic module 202 determines a correcting coefficient Kg corresponding to the oil temperature TG detected by the temperature sensor 119 by referencing map data, whereon the transmission efficiency η based on the transmission efficiency—versus—speed ratio characteristic is multiplied with the correcting coefficient Kg. In this way, the transmission efficiency η is corrected (step S63).

In general, since the transmission efficiency η of the torque converter 112 changes under the influence of the oil temperature TG, the transmission efficiency η determined on the basis of the map data (FIG. 3) will also change delicately in dependence on the oil temperature TG.

By way of example, the transmission efficiency η will change delicately or finely due to so-called heat loss when the oil temperature TG is high (or when the oil or fluidal viscosity is low, to say in another way) or due to so-called power loss when the oil temperature TG is low (or when the fluidal viscosity is high).

Accordingly, by correcting the transmission efficiency η determined on the basis of the map data represented by the characteristic curve shown in FIG. 3, there can be determined the transmission efficiency η closer to the actual value with high accuracy.

At this juncture, it should also be mentioned that the features of the first to fifth embodiments of the present invention described above can selectively be combined in desired forms which can provide advantageous effects and actions corresponding to the selected combinations.

Embodiment 6

In the control system for the internal combustion engine equipped with the automatic transmissions according to the second to fifth embodiments of the invention described hereinbefore (see FIGS. 7 to 13), the transmission efficiency η is corrected directly or straightforwardly in dependence on the engine operating state. However, instead of correcting the transmission efficiency η, the speed ratio e may be corrected in dependence on the engine operating state. In that case, the transmission efficiency η is ultimately corrected as a result of correction of the speed ratio e. The sixth embodiment of the present invention is directed to the correction of the speed ratio e and hence correction ultimately of the transmission efficiency η.

FIG. 14 to 17 are flow charts for illustrating a procedure for correcting the speed ratio e in conformance with the engine operating state to thereby determine arithmetically the transmission efficiency η in the automatic-transmission-equipped engine control system according to the sixth embodiment of the present invention, wherein flow charts shown in FIG. 14, FIG. 15, FIG. 16 and FIG. 17 correspond, respectively, to those shown in FIG. 7, FIG. 9, FIG. 11 and FIG. 13.

In FIGS. 14 to 17, steps similar to those described previously are designated by like reference characters, and repetitive description in detail thereof will be omitted. It should however be mentioned that in FIGS. 14 to 17, the step S12 (arithmetic determination based on the map data of the transmission efficiency—versus—speed ratio characteristics) is executed after the correcting arithmetic operation of the speed ratio e.

Figure 14:
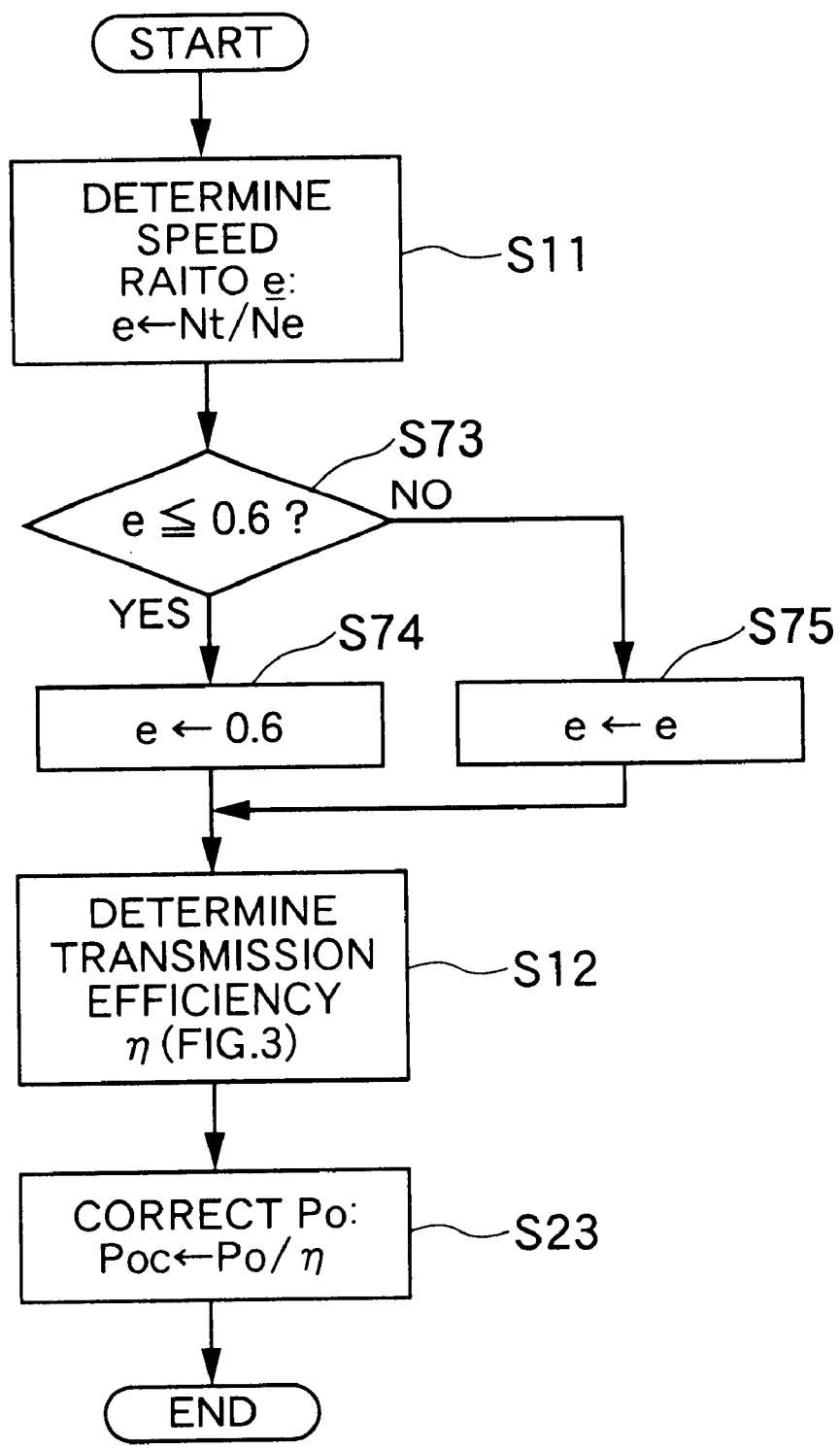
FIG. 14 is a flow chart for illustrating a processing procedure for correcting speed ratio upon lowering thereof according to a sixth embodiment of the present invention.

In FIG. 14, the steps S73, S74 and S75 correspond, respectively, to the steps S33, S34 and S35 described hereinbefore by reference to FIG. 7.

At first, the speed ratio arithmetic module 211 determines arithmetically the speed ratio e on the basis of the engine speed (rpm) Ne and the turbine speed Nt in the step S11, which is then followed by a step S73 where decision is made as to whether or not the speed ratio e is smaller than the lower limit value (=0.6) inclusive.

When it is decided in a step S73 that $e \leq 0.6$ (i.e., when the decision step S73 results in affirmation "YES"), the speed ratio e is set to the lower limit value (=0.6) in a step S74, while when decision is made that e>0.6, (i.e., when the decision step S74 results in negation "NO"), the speed ratio e determined arithmetically in the step S11 is set intactly as the speed ratio e (step S75).

In succession, the transmission efficiency arithmetic module 202 determines arithmetically the transmission efficiency η on the basis of the speed ratio e limited to be not smaller than the lower limit value (step S12).

In this way, correction or modification of the target driving power Po by dividing it by the transmission efficiency η of a small value can be prevented, as described previously.

In FIG. 15, the steps S83, S84 and S85 correspond, respectively, to the steps S43, S44 and S45 described hereinbefore by reference to FIG. 9.

Referring to FIG. 15, in succession to the arithmetic determination of the speed ratio e (step S11), the speed ratio arithmetic module 211 makes decision as to whether or not the operating state of the engine 101 is in the deceleration mode or alternatively whether or not the speed ratio e is decreasing (or has decreased to a predetermined value) in a step S83.

When it is detected in the step S83 that the engine 101 is in deceleration mode or the speed ratio e is decreasing (or alternatively the speed ratio e is equal to or less than a predetermined value, and thus decision is made that the engine is in the transient operation state (i.e., when the decision step S83 results in affirmation "YES"), then the speed ratio arithmetic module 211 sets the speed ratio e to a given constant value (=1) in a step S84.

By contrast, when it is decided in the step S83 that the engine 101 is not decelerating and that the speed ratio e is not decreasing (and that the speed ratio e is greater than a predetermined value), i.e., when the step S83 results in negation "NO", the speed ratio arithmetic module 211 sets the speed ratio e determined arithmetically in the step S11 intactly or straightforwardly as the speed ratio e in a step S85.

Thereafter, the transmission efficiency arithmetic module 202 arithmetically determines the transmission efficiency η on the basis of the speed ratio e limited to the given constant value in dependence on the engine operating state in a step S12.

In this way, degradation of driving comfortableness can be prevented e.g. during deceleration, as described hereinbefore.

Figure 16:
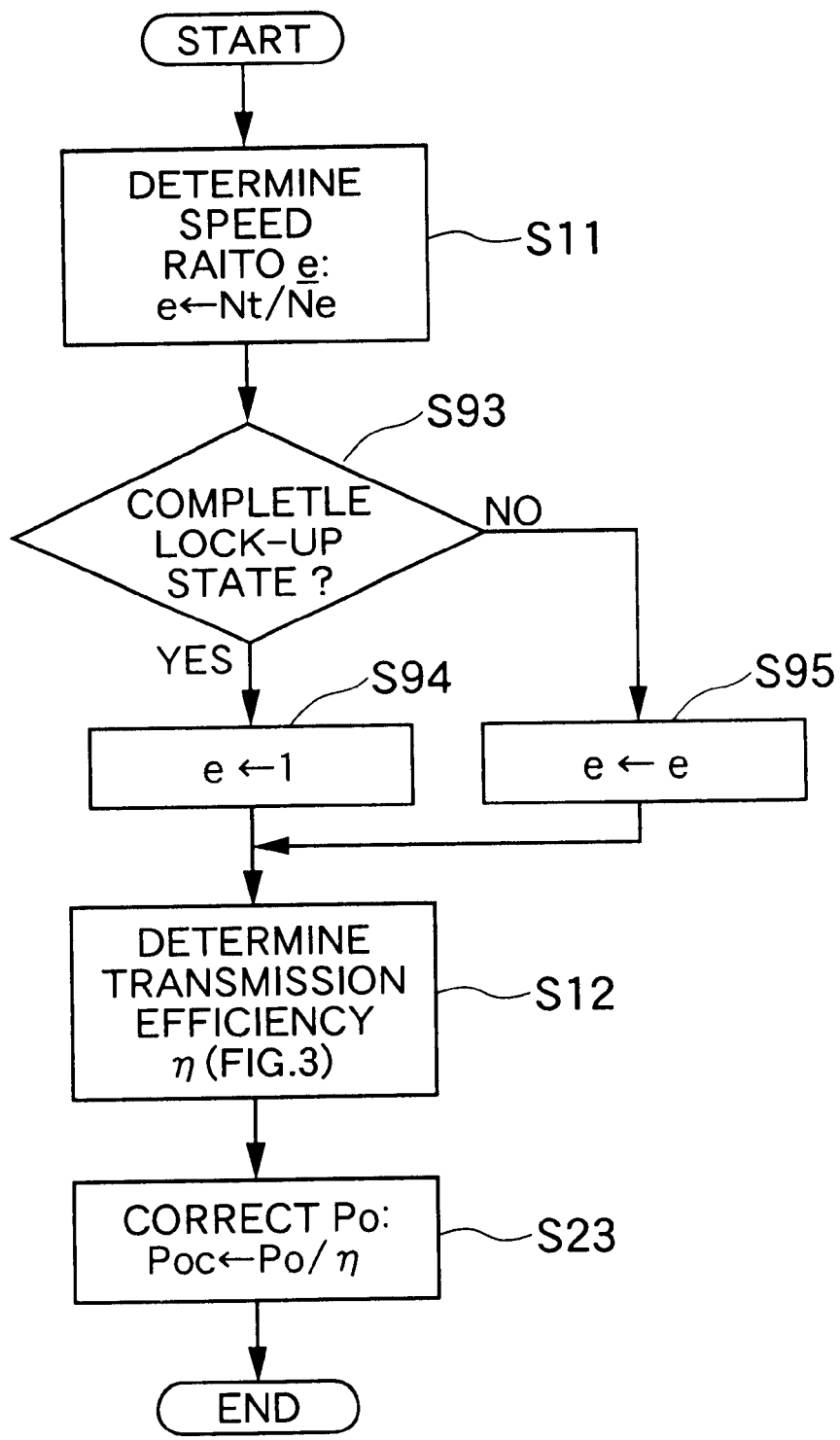
FIG. 16 is a flow chart for illustrating a speed ratio correction inhibit operation of the automatic-transmission-equipped engine control system in a complete lock-up state according to the sixth embodiment of the invention.

In FIG. 16, the steps S93, S94 and S95 correspond, respectively, to the steps S53, S54 and S55 described previously by reference to FIG. 11.

In succession to the arithmetic determination of the speed ratio e (step S11), the speed ratio arithmetic module 211 decides whether or not the operating state derived from the output of the lock-up state detecting module 214 indicates the complete lock-up state (step S93).

When the complete lock-up state is decided in the step S93 (i.e., when this decision step S93 results in affirmation "YES"), the speed ratio e is set fixedly to a given constant value (e.g. "1" (one)) in a step S94. On the other hand, unless the complete lock-up state is decided (i.e., when the step S93 results in "NO"), the speed ratio e determined arithmetically is set intactly as the speed ratio e (step S95).

Subsequently, the transmission efficiency arithmetic module 202 determines arithmetically the transmission efficiency η on the basis of the speed ratio e set fixedly to the given constant value (=1) in conformance to the complete lock-up state (step S12). In this way, the transmission efficiency η is set to the given constant value (=100%) in the complete lock-up state, whereby the correction of the target driving power Po by the transmission efficiency η is inhibited in the complete lock-up state.

Figure 17:
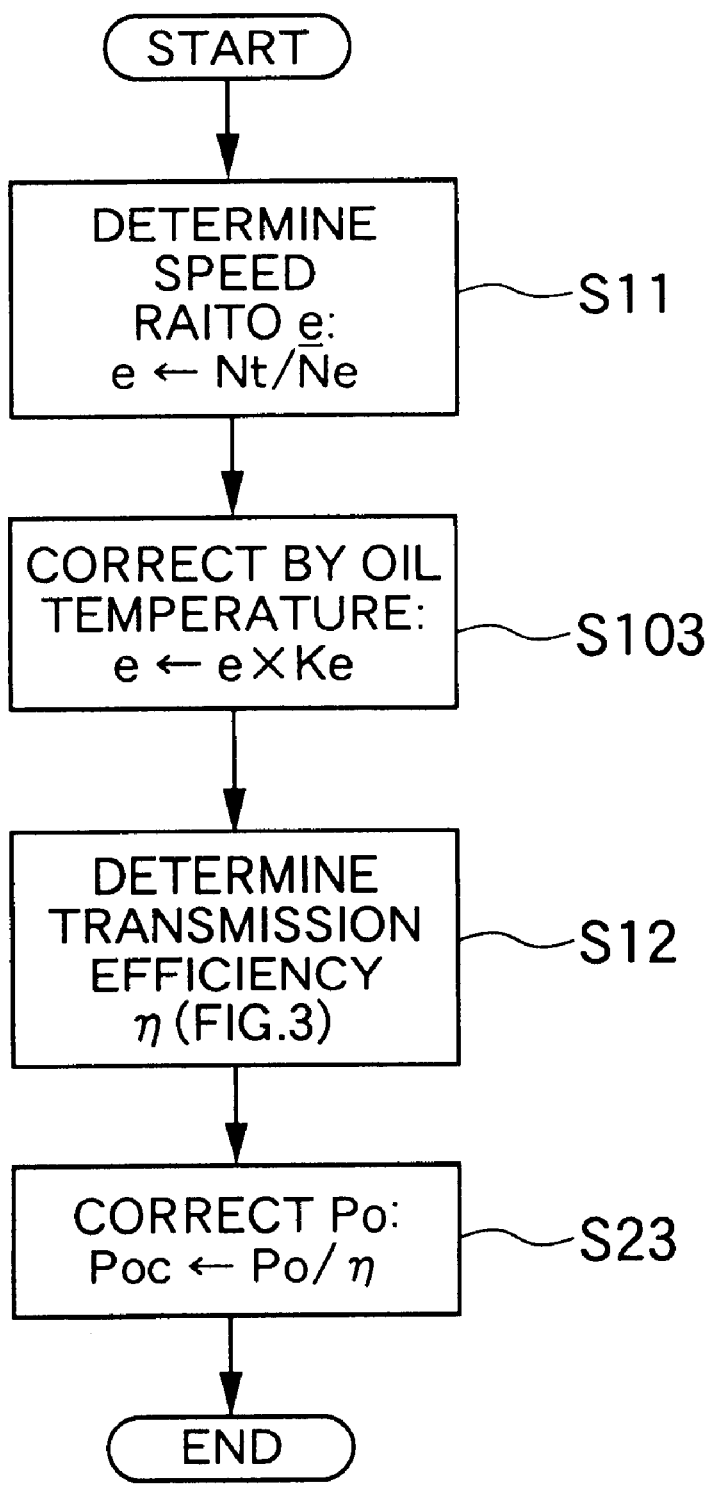
FIG. 17 is a flow chart for illustrating a speed ratio correcting operation in dependence on oil temperature according to the sixth embodiment of the invention.

Next, referring to FIG. 17, the step S103 shown therein corresponds to the step S63 mentioned previously by reference to FIG. 13.

At first, the speed ratio arithmetic module 211 determines a correcting coefficient Ke relevant to the prevailing oil temperature TG by referencing the map data, as mentioned previously, whereon the speed ratio e is multiplied by the correcting coefficient Ke to thereby correct the speed ratio e (step S12).

In succession, the transmission efficiency arithmetic module 202 determines arithmetically the transmission efficiency η on the basis of the speed ratio e corrected in view of the prevailing oil temperature TG (step S12).

Through the procedure described above, the accurate transmission efficiency η approximating the real or actual value can be determined arithmetically.

Thus, with the automatic-transmission-equipped engine control system according to the sixth embodiment of the present invention, degradation of the driver's driving comfortableness can positively be prevented because not only the speed ratio e but also the transmission efficiency η can be corrected.

Embodiment 7

In the automatic-transmission-equipped engine control system according to the first to sixth embodiments, no description has been made in concrete concerning the function of the transmission efficiency arithmetic module 202 (see FIG. 2). However, by computing the target transmission input speed Nio by multiplying the target engine speed Neo by the speed ratio e, it is possible to determine accurately the target transmission input speed Nio for realizing the target engine speed Neo in the nonlock-up state of the torque converter 112.

Figure 18:
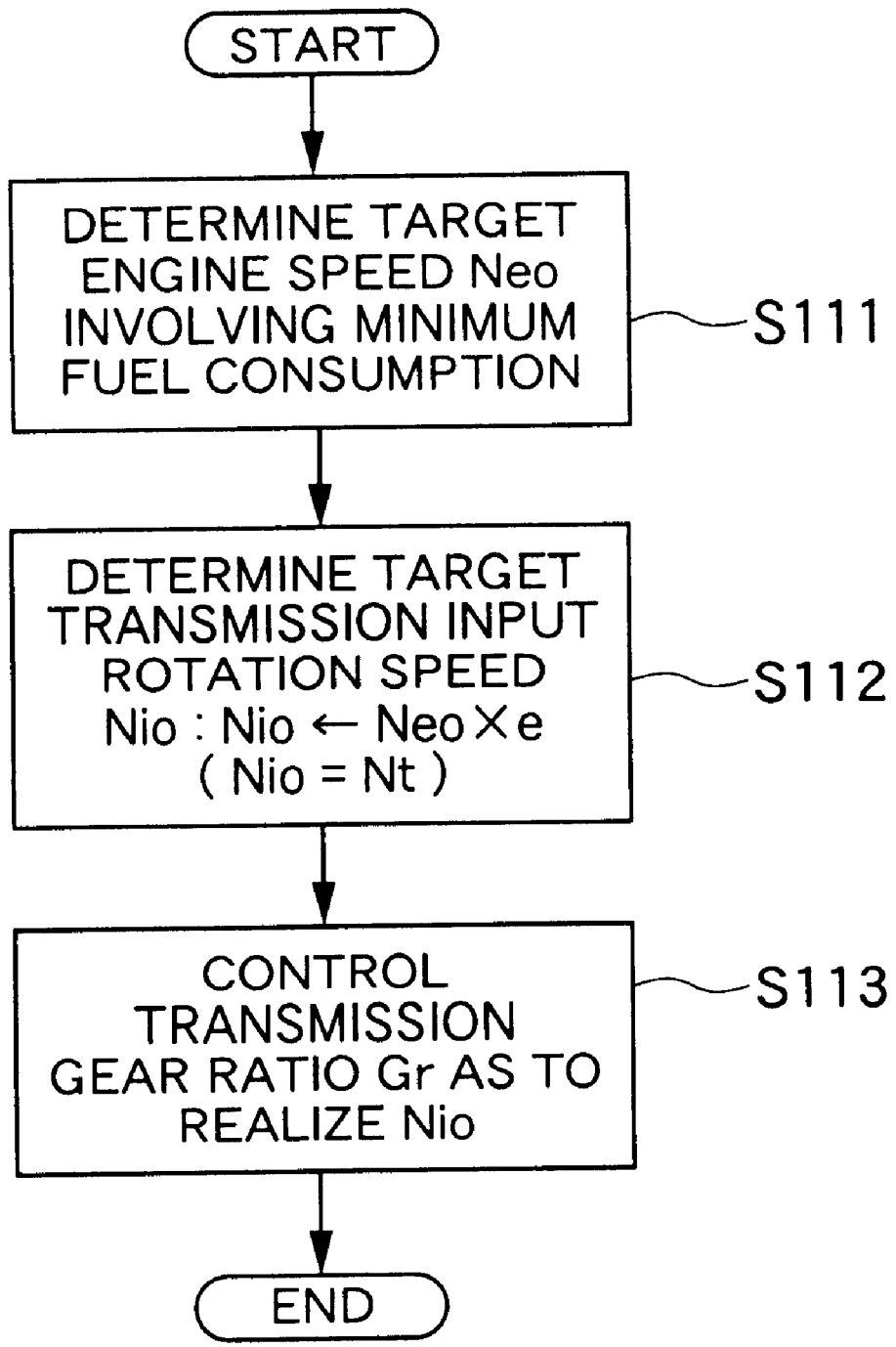
FIG. 18 is a flowchart for illustrating operation for correcting a target transmission input speed in dependence on a speed ratio in the automatic-transmission-equipped engine control system according to a seventh embodiment of the present invention.

FIG. 18 is a flow chart for illustrating arithmetic operation of the target transmission input speed Nio by multiplying the target engine speed Neo by the speed ratio e in the automatic-transmission-equipped engine control system according to a seventh embodiment of the present invention, and FIG. 19 is a view for illustrating variation of the speed in the automatic-transmission-equipped engine control system according to the instant embodiment of the invention.

In general, when the torque converter 112 is in the complete lock-up state, the engine speed (rpm) Ne coincides with the input speed Ni of the continuously variable transmission (CVT) 114. Accordingly, control of the transmission gear ratio Gr of the continuously variable transmission (CVT) 114 effectuated so that the target transmission input speed Nio can be realized is equivalent to the control of the transmission gear ratio Gr of the continuously variable transmission 114 effectuated so that the target engine speed Neo can be realized.

However, in the nonlock-up state of the torque converter 112, the engine speed (rpm) Ne does not coincide with the input speed Ni of the continuously variable transmission 114 (refer to FIG. 19). Consequently, it is impossible to realize the target engine speed Neo even when the transmission gear ratio Gr of the continuously variable transmission or CVT 114 is controlled so that the target transmission input speed Nio (=Neo) can be attained.

Under the circumstances, the target engine speed Neo is multiplied by the speed ratio e of the torque converter 112 in order to make it possible to arithmetically determine the target transmission input speed Nio which can satisfy the target engine speed Neo and hence to control the transmission gear ratio Gr of the continuously variable transmission (CVT) 114 so as to satisfy the target transmission input speed Nio.

Referring to FIG. 18, the target engine speed arithmetic module 204 arithmetically determines at first the target engine speed Neo which can lead to the minimum fuel consumption (step S111). In succession, the multiplier module 205 multiplies the target engine speed Neo by the speed ratio e to thereby determine arithmetically the target transmission input speed Nio (step S112).

In succession, the target transmission gear ratio arithmetic module 213 determines arithmetically the transmission gear ratio Gr of the continuously variable transmission or CVT 114 to control correspondingly the CVT 114 (step S113).

In practical applications, the target transmission input speed Nio is corrected through the medium of the target transmission input speed correcting module 212 to be inputted to the target transmission gear ratio arithmetic module 213 as the corrected target transmission input speed Nioc.

In this manner, by correcting the target engine speed Neo by multiplying the speed ratio e in the nonlock-up state of the torque converter 112, the target transmission input speed Nio which can realize the target driving point (target engine speed Neo) without impairing driver's comfortableness feeling can be realized at the maximum fuel-performance cost.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of examples, although the engine control unit 100 and the automatic transmission control unit 110 have been described on the presumption that they are realized discretely from each other. It goes however without saying that the engine control unit 100 and the automatic transmission control unit 110 can be implemented by using a single microcomputer. In that case, the various modules described hereinbefore in conjunction with the engine control unit 100 and the automatic transmission control unit 110 can be realized in the forms of computer-executable programs.

Accordingly, all suitable modifications and equivalents may be resorted to, falling within the spirit and scope of the invention.

What is claimed is:

1. In a control system for an internal combustion engine equipped with an automatic transmission, comprising:

a set of various types sensors for detecting operating state of said internal combustion engine;

an intake air quantity regulating unit for regulating adjustably an intake air quantity of said internal combustion engine;

an automatic transmission including an input clutch and a continuously variable transmission coupled operatively to said engine for regulating a transmission gear ratio continuously variably; and a control unit for controlling said engine and said automatic transmission on the basis of said operating state of said engine;

said control unit comprising:

a target driving power arithmetic module for arithmetically determining a target driving power of said engine on the basis of said operating state of said engine;

a transmission efficiency arithmetic module for arithmetically determining a transmission efficiency of said input clutch;

a target driving power correcting module for correcting said target driving power in dependence on said transmission efficiency to thereby determine arithmetically a corrected target driving power;

a target value selecting module for selecting a combination of a target engine speed and a target engine torque for realizing said corrected target driving power;

a target intake air quantity arithmetic module for arithmetically determining a target intake air quantity for realizing said target engine torque; and a target transmission input speed arithmetic module for arithmetically determining a target transmission input speed of said continuously variable transmission so that the input speed of said automatic transmission coincides with said target engine speed, wherein said intake air quantity regulating unit is so controlled that the intake air quantity of said engine coincides with said target intake air quantity, and wherein said transmission gear ratio is so controlled that the input speed of said continuously variable transmission coincides with said target transmission input speed.

2. A control system for an internal combustion engine equipped with an automatic transmission according to claim 1, wherein said target driving power correcting module is comprised of a divider module designed for dividing said target driving power by said transmission efficiency.

3. A control system for an internal combustion engine equipped with an automatic transmission according to claim 1, wherein said transmission efficiency arithmetic module is so designed as to correct said transmission efficiency in dependence on said operating state.

4. A control system for an internal combustion engine equipped with an automatic transmission according to claim 1, wherein said transmission efficiency arithmetic module includes lower limit value setting means for setting a lower limit value of said transmission efficiency.

5. A control system for an internal combustion engine equipped with an automatic transmission according to claim 1, wherein said transmission efficiency arithmetic module is so designed as to set said transmission efficiency to a given constant value when said transmission efficiency is not greater than a predetermined value.

6. A control system for an internal combustion engine equipped with an automatic transmission according to claim 1, wherein said transmission efficiency arithmetic module is so designed as to set said transmission efficiency to a given constant value when operating state of said engine indicates that said vehicle speed is decelerating.

7. A control system for an internal combustion engine equipped with an automatic transmission according to claim 1, wherein said transmission efficiency arithmetic module is so designed as to set said transmission efficiency to a given constant value when a speed ratio between an input element and an output element of said input clutch is decreasing.

8. A control system for an internal combustion engine equipped with an automatic transmission according to claim 1, wherein said input clutch is comprised of a fluid type torque converter which includes a lock-up mechanism, wherein said control unit includes a lock-up state detecting module for detecting a complete lock-up state of said lock-up mechanism, and wherein correction of said target driving power is inhibited so long as said complete lock-up state is detected by said lock-up state detecting module.

9. A control system for an internal combustion engine equipped with an automatic transmission according to claim 8, wherein when said lock-up mechanism is in the complete lock-up state, said transmission efficiency arithmetic module sets said transmission efficiency fixedly to 100% to thereby inhibit the correction of said target driving power.

10. A control system for an internal combustion engine equipped with an automatic transmission according to claim 8, wherein when difference in speed between an input shaft and an output shaft of said torque converter is less than a predetermined speed inclusive, said lock-up state detecting module detects the complete lock-up state of said lock-up mechanism.

11. A control system for an internal combustion engine equipped with an automatic transmission according to claim 1, wherein said input clutch is comprised of a fluid type torque converter, and wherein said transmission efficiency arithmetic module is so designed as to correct said transmission efficiency in dependence on a temperature of a fluid accommodated within said automatic transmission.

12. A control system for an internal combustion engine equipped with an automatic transmission according to claim 1, wherein said control unit includes a speed ratio arithmetic module for arithmetically determining a speed ratio on the basis of a ratio between an input speed and an output speed of said input clutch, and wherein said transmission efficiency arithmetic module determines arithmetically said transmission efficiency on the basis of said speed ratio.

13. A control system for an internal combustion engine equipped with an automatic transmission according to claim 12, wherein said transmission efficiency arithmetic module imposes limitation onto said transmission efficiency on the basis of said speed ratio.

14. A control system for an internal combustion engine equipped with an automatic transmission according to claim 1, wherein said control unit includes a speed ratio arithmetic module for arithmetically determining a speed ratio on the basis of a ratio between an input speed and an output speed of said input clutch, and wherein said target transmission input speed arithmetic module is so designed as to multiply said target engine speed by said speed ratio to thereby determine arithmetically said target transmission input speed.

* * * * *